United States Patent

Monzaki

[11] Patent Number: 5,570,935
[45] Date of Patent: Nov. 5, 1996

[54] ANTI-LOCK CONTROLLER

[75] Inventor: Shirou Monzaki, Mishima, Japan

[73] Assignee: Toyota Jidosha Kabushiki Kaisha, Japan

[21] Appl. No.: 357,183

[22] Filed: Dec. 13, 1994

[30] Foreign Application Priority Data

Dec. 17, 1993 [JP] Japan .................................. 5-318655

[51] Int. Cl.$^6$ ....................................................... B60T 8/32
[52] U.S. Cl. ............................................ 303/155; 303/163
[58] Field of Search ...................................... 303/155, 156, 303/160, 163, 165, 113.1; 188/181 R, 181 A

[56] References Cited

U.S. PATENT DOCUMENTS

| | | | |
|---|---|---|---|
| 3,637,264 | 1/1972 | Leiber et al. | 303/21 BE |
| 4,346,774 | 8/1982 | Hirota et al. | 180/167 |
| 4,432,229 | 2/1984 | Nowogrodzki | 73/146 |
| 4,713,665 | 12/1987 | Phelan | 342/104 |
| 4,800,498 | 1/1989 | Matsui et al. | 364/426.02 |
| 4,900,101 | 2/1990 | Becker et al. | 303/110 |
| 4,912,641 | 3/1990 | Kuwana et al. | 364/426.02 |
| 4,932,726 | 6/1990 | Iwata et al. | 303/100 |
| 4,986,611 | 1/1991 | Goshima et al. | 303/100 |
| 4,987,966 | 1/1991 | Fujita | 303/141 X |
| 5,204,682 | 4/1993 | Beasley | 342/117 |
| 5,275,474 | 1/1994 | Chin et al. | 303/162 X |
| 5,334,983 | 8/1994 | Ikeda et al. | 342/70 |
| 5,358,318 | 10/1994 | Ikeda et al. | 188/181 R X |

FOREIGN PATENT DOCUMENTS

| | | |
|---|---|---|
| 298617 | 1/1989 | European Pat. Off. . |
| 539263 | 4/1993 | European Pat. Off. . |
| 3825639 | 2/1990 | Germany . |
| 56-53943 | 5/1981 | Japan . |
| 63-64861 | 3/1988 | Japan . |
| 2-70561 | 3/1990 | Japan . |
| 2-129960 | 10/1990 | Japan . |
| 5-85341 | 4/1993 | Japan . |

Primary Examiner—Lee W. Young
Attorney, Agent, or Firm—Oliff & Berridge

[57] ABSTRACT

A slip rate at a time when a wheel deceleration corresponding to the difference between the road-surface reactive torque and the braking torque has become greater than or equal to a predetermined value set on the basis of a vehicle deceleration is computed. An offset amount between the slip rate computed on the basis of the wheel deceleration and a targeted slip rate at which a coefficient of braking friction becomes maximum is computed. A wheel speed at the targeted slip rate is calculated as a targeted wheel speed on the basis of the calculated slip rate, the calculated offset amount, and a vehicle speed. Then, the braking torque of the wheel is controlled such that the wheel speed becomes equal to the targeted wheel speed.

20 Claims, 18 Drawing Sheets

FIG.9A GENERAL μ-S CHARACTERISTIC CURVE
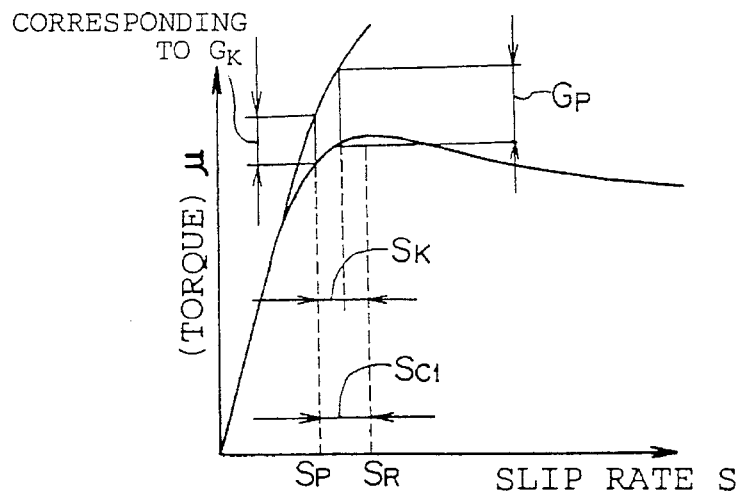
FIG.9B PEAKY μ-S CHARACTERISTIC CURVE
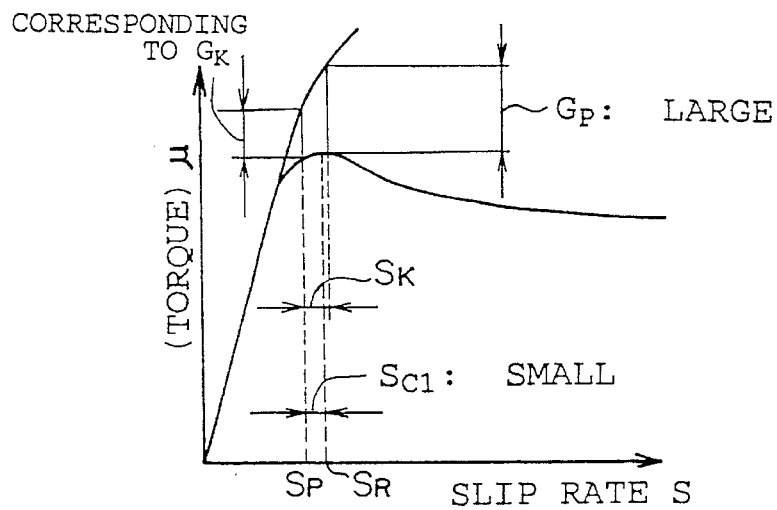
FIG.9C GENTLE μ-S CHARACTERISTIC CURVE
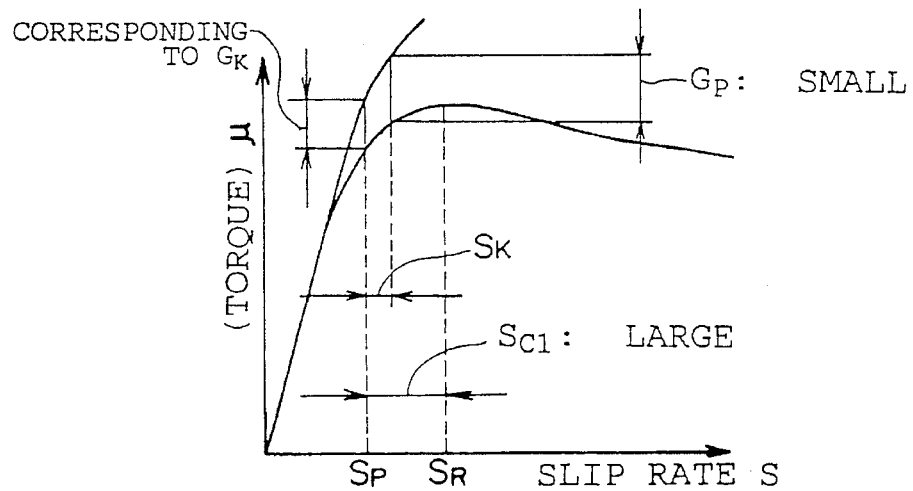

FIG.12A TARGETED SLIP RATE $S_R$: APPROPRIATE
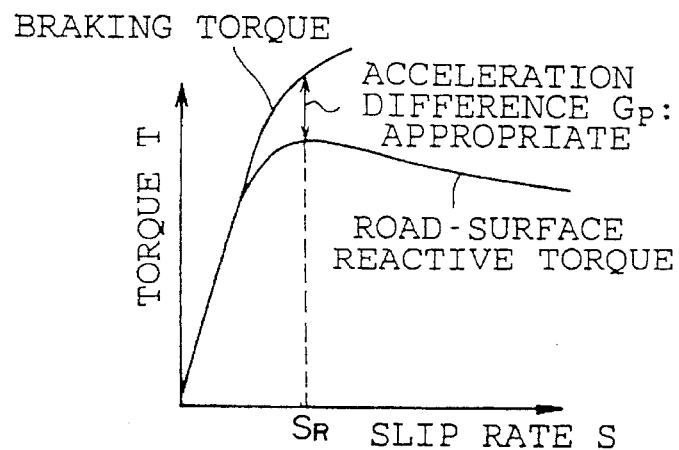
FIG.12B TARGETED SLIP RATE $S_R$: EXCESSIVELY SMALL
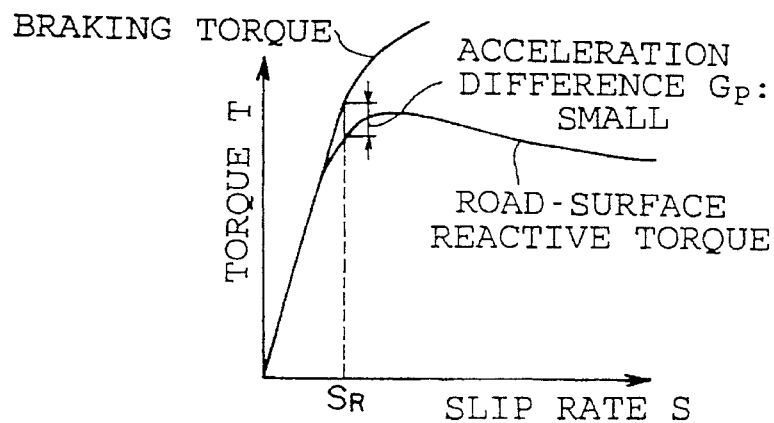
FIG.12C TARGETED SLIP RATE $S_R$: EXCESSIVELY LARGE
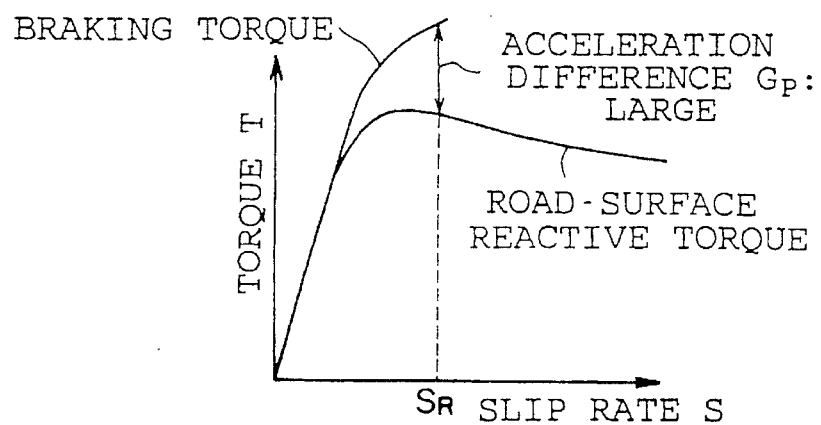

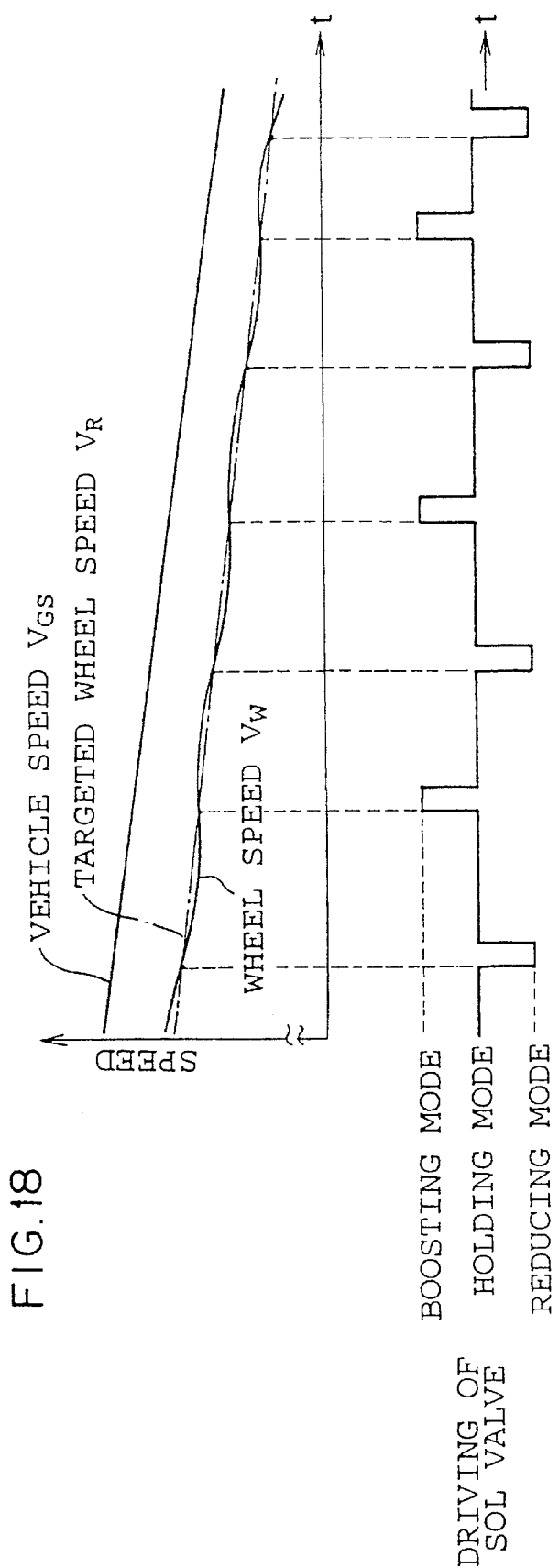

ANTI-LOCK CONTROLLER

BACKGROUND OF THE INVENTION

1. Field of the Invention

The present invention relates to an anti-lock controller, and more particularly to an anti-lock controller for improving the safety of a vehicle by preventing a wheel from becoming locked when brakes are applied to the vehicle.

2. Description of the Related Art if a brake pedal or the like is operated during the traveling of the vehicle, the braking torque of a magnitude corresponding to the amount of the pedal or the like operated is applied to the wheels by a braking device such as a hydraulic braking device. The wheel speed (the rotating speed of the wheel) becomes lower than the vehicle speed due to this braking torque (undergoes so-called slip), so that sliding friction occurs between the wheel and the road surface. This sliding friction serves as a braking force, and the vehicle is thereby decelerated or brought to a standstill. The slip rate which represents the degree of slip is defined by the following Formula (1) if it is assumed that a vehicle speed is $V_{GS}$, and that a wheel speed is $V_W$:

$$\text{Slip rate } S = \frac{V_{GS} - V_W}{V_{GS}} \times 100 \, [\%] \quad (1)$$

The braking force is dependent upon a coefficient of braking friction μ (hereafter simply referred to as "μ") acting between the wheel and the road surface, and μ changes in correspondence with the slip rate S. On dry asphalt, for example, μ changes substantially in proportion to the slip rate S when the slip rate is low, as shown in FIG. 1A, and μ reaches a peak (the braking force also reaches a peak) when the slip rate S is at a predetermined value (generally, 8 to 30% or thereabouts; $S_R$ shown in FIG. 1A). If a still higher braking torque is applied and the slip rate S exceeds the predetermined value $S_R$, μ declines (and the braking force also declines correspondingly). With a decline in μ, the braking force declines, which results in an increase in the braking distance, a substantial decline in the cornering force of the tire due to the slip rate, and the like. Hence, the stability of the vehicle declines. Then, if a higher braking torque is applied, the wheel becomes locked (slip rate S=1), thereby resulting in the loss of the directional stability and steerability of the vehicle.

To prevent the wheel from becoming locked during the braking of the vehicle and bring the vehicle to a standstill in a short braking distance, anti-lock controllers, i.e., anti-lock braking systems, of various arrangements have hitherto been proposed. For example, there has been proposed an anti-lock controller in which a slip rate at which μ reaches a peak is fixedly set in advance as a targeted slip rate, a targeted wheel speed is computed on the basis of a vehicle speed estimated from the wheel speed and the targeted slip rate, and the braking torque is controlled such that the wheel speed becomes the targeted wheel speed. However, since the slip rate at which μ reaches a peak varies depending on the condition of the road surface and the like, even if the braking torque is controlled on the basis of the slip rate which is fixedly set as described above, it does not necessarily follow that an optimal braking state is always obtained under various conditions of the road surface.

In addition, Japanese Patent Application Laid-Open No. 56-53943 discloses a technique wherein the peak of μ is detected on the basis of a change in the wheel speed while controlling the braking torque in predetermined periods during the braking of the vehicle, a tendency of the change in the targeted wheel speed is determined on the basis of respective wheel speeds $V_{W1}$ and $V_{W2}$ at a point of time when two peaks of μ have been detected, and the targeted wheel speed during an ensuing control period is determined by extrapolation on the basis of that tendency.

However, the wheel speeds $V_{W1}$ and $V_{W2}$ at the peaks of μ include detection errors, and these errors increase as the time interval of the detection of the wheel speeds $V_{W1}$ and $V_{W2}$ becomes large. Hence, to reduce the effect of the errors, it is necessary to shorten the control period, and increase the frequency of detection of the peaks of μ. In addition, in the above-described publication, it is stated that the wheel is subjected to skid control in a short control period, the acceleration of the wheel, the wheel load, and the braking torque existing at that time are detected, and an equation of motion is solved, so as to detect a peak of μ. However, with the above-described method of detecting the peak of μ, as is apparent from FIG. 5 of the publication, the peak of μ cannot be detected unless the magnitude of the braking torque is changed with respect to the peak of μ such that μ changes to some extent. Accordingly, there has been a problem in that the braking performance deteriorates in detecting the peak of μ.

SUMMARY OF THE INVENTION

The present invention has been devised in view of the above-described circumstances, and it is an object of the present invention to provide an anti-lock controller which is capable of preventing a wheel from becoming locked without impairing the braking performance.

To attain the above object, in accordance with the present invention, there is provided an anti-lock controller comprising: a sensor for detecting a wheel speed; first computing means for computing a slip rate existing at a time when a wheel deceleration, which is determined on the basis of the wheel speed, has become greater than or equal to a predetermined value set on the basis of a vehicle deceleration; second computing means for computing an offset amount representing an offset between the slip rate computed by the first computing means and a targeted slip rate, on the basis of at least one of the wheel deceleration and the vehicle deceleration; third computing means for computing as a targeted wheel speed the wheel speed at the targeted slip rate on the basis of the slip rate computed by the first computing means, the offset amount computed by the second computing means, and a vehicle speed; and control means for controlling a braking force such that the wheel speed becomes equal to the targeted wheel speed calculated by the third computing means.

In the present invention, the second computing means preferably computes the offset amount on the basis of a magnitude of the wheel acceleration existing during a period from the time the wheel deceleration became the predetermined value set in correspondence with the vehicle deceleration.

Preferably, the anti-lock controller further comprises: determining means for determining whether a vibrational change has occurred to the wheel acceleration; and slip-rate computing means for computing the slip rate existing when the wheel acceleration has become maximal, wherein the third computing means computes the targeted wheel speed by setting as the targeted slip rate the slip rate computed by the slip-rate computing means if it is determined by the determining means that the vibrational change has occurred to the wheel acceleration.

Preferably, the anti-lock controller further comprises: first correcting means for correcting the offset amount on the basis of a magnitude of the vehicle deceleration existing during a predetermined period while the control means is reducing the braking force, wherein the third computing means computes the wheel speed at the targeted slip rate on the basis of the slip rate computed by the first computing means, the corrected offset amount, and the vehicle speed.

Preferably, the anti-lock controller further comprises: second correcting means for correcting the offset amount such that the offset amount increases if the wheel acceleration existing after the lapse of a predetermined time from the time an increase in the braking force is started by the control means is greater than or equal to a predetermined value, wherein the third computing means computes the wheel speed at the targeted slip rate on the basis of the slip rate computed by the first computing means, the corrected offset amount, and the vehicle speed.

Preferably, an arrangement is provided such that a braking device applies a braking force to the wheel by means of the pressure of the fluid, and control means switches the solenoid valve on and off, controls the braking force by changing the pressure of the fluid by changing a duty ratio of the on-off operation, and, if it is unnecessary to change the braking force at high speed when the pressure of the fluid is to be increased or reduced, switches the solenoid valve on and off with a pattern beginning with off.

The relationship between the slip rate S on the one hand, and the coefficient of braking friction $\mu$ between the wheel and the road surface on the other, (hereafter referred to as the $\mu$-S characteristic) changes in correspondence with the condition of the road surface. However, the $\mu$-S characteristic under a certain condition of the road surface (e.g., dry asphalt or the like) is substantially fixed. In addition, if it is assumed that the inertia of the wheel is I, the angular acceleration in the rotation of the wheel is $\omega'$ (' represents differentiation with respect to time), the wheel load is W, the radius of the wheel is R, and the braking torque is $T_B$, the equation of motion when a braking force is applied to the wheel can be expressed by the following Formula (2):

$$I \cdot \omega' = W \cdot \mu \cdot R - T_B \quad (2)$$

In Formula (2) above, the first term on the right-hand side represents a road-surface reactive torque $T_S$. Since the radius of the wheel R is fixed, if the wheel load W is assumed to be fixed, the road-surface reactive torque $T_S$ changes in proportion to $\mu$ with respect to the change in the slip rate, as shown in FIG. 1B, and at a point close to the peak of $\mu$, the gradient in the increase with respect to the increase in the slip rate becomes gradually gentle (this point is referred to as a point of inflection). Meanwhile, the gradient of the braking torque does not substantially change even in the vicinity of the point of inflection. The angular acceleration of the wheel $\omega'$ corresponds to the difference between the road-surface reactive torque $T_S$ and the braking torque $T_B$, as shown in Formula (2), and its value suddenly decreases (increases in the negative direction (decelerating direction)) if the slip rate increases by exceeding the point of inflection. Since the wheel speed $V_W$ is such that $V_W = R \cdot \omega$, the wheel acceleration $G_W$, which is an amount of change in unit time of the wheel speed, is such that $G_W = R \cdot \omega'$, and $G_W$ also changes in the same way as $\omega'$. In addition, if it is assumed that the difference among the slip rates of the individual wheels provided in the vehicle is small, the vehicle deceleration can be regarded as being substantially proportional to the road-surface reactive torque.

On the basis of the above-described facts, in the present invention, the slip rate at a time when the wheel deceleration has become greater than or equal to a predetermined value set on the basis of the vehicle deceleration is computed by the first computing means. The slip rate computed by the first computing means does not necessarily become equal to the slip rate at which $\mu$ becomes maximum. However, since the predetermined value is set on the basis of the vehicle deceleration, so that if the condition of the road surface is the same, the slip rate computed by the first computing means becomes a substantially fixed value. Hence, through this computation, it is possible to obtain the slip rate in the vicinity of the point of inflection where the vehicle deceleration increases suddenly (for instance, if the predetermined value is $G_K$ shown in FIG. 1B, a slip rate $S_P$ is obtained). In addition, the difference (an offset amount $S_{C1}$ in FIG. 1B) between the slip rate computed by the first computing means and the slip rate at which $\mu$ becomes maximum also becomes a substantially fixed value if the condition of the road surface is the same.

For this reason, the second computing means computes an offset amount between the slip rate computed by the first computing means and a targeted slip rate (a slip rate at which the coefficient of friction $\mu$ between the road surface and the wheel becomes maximum), on the basis of at least one of the vehicle deceleration and the wheel deceleration which change in correspondence with the condition of the road surface. Consequently, the slip rate (i.e., a targeted slip rate; the slip rate $S_R$ in FIG. 1B) in which the offset amount computed by the second computing means is added to the slip rate computed by the first computing means, can be regarded as the targeted slip rate (e.g., a slip rate $S_0$ at which $\mu$ becomes maximum in FIG. 1A).

Accordingly, the third computing means is capable of computing as the targeted wheel speed the wheel speed at the targeted slip rate on the basis of the slip rate computed by the first computing means and the offset amount computed by the second computing means, and the vehicle speed. Since the control means controls the braking force of the braking device such that the wheel speed becomes equal to the computed targeted wheel speed, it is possible to provide optimal braking such that $\mu$ is located in the vicinity of a maximum point, thereby preventing the wheel from becoming locked.

Thus, in the present invention, the peak of $\mu$ is not detected by changing the slip rate with respect to a slip rate at which $\mu$ reaches a peak as in the conventional manner, but a targeted slip rate (e.g., a slip rate at which $\mu$ becomes maximum) is estimated before $\mu$ becomes maximum, and control is provided such that an actual slip rate becomes equal to the targeted slip rate. Thus, the braking performance of the braking device is not impaired in detecting the peak of $\mu$.

It should be noted that, to be precise, the angular acceleration of the wheel $\omega'$ in Formula (2) above is a relative acceleration (acceleration difference) with respect to the vehicle acceleration, and the wheel acceleration which is actually detected by a sensor or the like is one in which a vehicle acceleration $G_{GS}$ is further subtracted from the acceleration difference (to differentiate this detected wheel acceleration from $V_W'$, it will be hereafter referred to as $G_W$). The mass M of the vehicle is very large as compared to the inertia I of the wheel, and in terms of a very short time span the vehicle acceleration can be regarded as being substantially fixed with respect to the wheel acceleration. Accordingly, either $\omega'$ or $G_W$ may be used as the wheel acceleration in performing the computation pertaining to the present invention.

The computation of the offset amount by the second computing means is preferably effected on the basis of, for instance, the magnitude of the wheel acceleration existing during a period from the time the wheel deceleration became the predetermined value set in correspondence with the vehicle deceleration. Specifically, the offset amount can be computed on the basis of the absolute value of the wheel acceleration during that period or the difference between the wheel deceleration and the vehicle deceleration. The manner in which the wheel acceleration changes when the braking force is boosted by exceeding the aforementioned point of inflection is dependent upon the condition of the road surface, including $\mu$. Accordingly, by computing the offset amount as described above, the difference in the profile of the $\mu$-S characteristic curve, which is ascribable to the difference in the condition of the road surface, can be reflected in the offset amount. Therefore, the accuracy of the offset amount computed by the second computing means improves, with the result that the accuracy of the targeted slip rate with respect to the slip rate at which $\mu$ actually becomes maximum also improves. Hence, it is possible to provide more appropriate braking in correspondence with the condition of the road surface.

In anti-lock control, it is known that if, for instance, a situation is detected in which a wheel is tending to become suddenly locked, and the braking force is suddenly reduced to prevent lock, there are cases where a vibrational change (the so-called vibrations of the wheel) occurs to the wheel acceleration (see FIG. 2B). In the event that such vibrations of the wheel have occurred, the wheel acceleration temporarily becomes less than or equal to a predetermined value in the decelerating direction, i.e., the wheel deceleration becomes greater than or equal to the predetermined value (e.g., point $P_1$ in FIG. 2B), so that a new slip rate is computed by the first computing means. Hence, there are cases where an inappropriate value is set as the targeted slip rate. If an inappropriate value is set as the targeted sip rate, the braking force is controlled on the basis of the inappropriate slip rate, thereby deteriorating the braking performance.

For this reason, it is preferable to further provide the determining means for determining whether a vibrational change has occurred to the wheel acceleration and slip-rate computing means for computing the slip rate existing when the wheel acceleration has become maximal, and to allow the third computing means to compute the targeted wheel speed by setting as the targeted slip rate the slip rate computed by the slip-rate computing means if it is determined by the determining means that the vibrational change has occurred to the wheel acceleration.

If the vibrations of the wheel have occurred, as the braking toque is reduced, the road-surface reactive torque $T_S$, which was at the position of the point A in FIG. 2C before reducing the braking force (braking torque), changes up to the point C (the vicinity of the point of inflection) at which it balances with the reduced braking torque, via the point B at which $\mu$ becomes maximum. As described before, if the wheel load W and the wheel radius R are assumed to be fixed, the road-surface reactive torque $T_S$ becomes maximum at the point B at which $\mu$ becomes maximum, so that the wheel acceleration $\omega'$ ($G_W$) also assumes a maximum value in the positive direction at the point B in accordance with Formula (2). Therefore, since the slip rate at a point of time when the wheel acceleration has become maximal, i.e., when $\mu$ has become maximum (point $P_2$ in FIG. 2B), is computed by the slip-rate computing means, even if the vibrations of the wheel have occurred, it is possible obtain as the targeted slip rate the slip rate at which $\mu$ becomes maximum. Hence, it is possible to prevent the deterioration of the braking performance.

In addition, even if the above-described control is carried out, should the condition of the road surface change, there are cases where the optimal slip rate for braking, at which $\mu$ becomes maximum, changes, with the result that a large difference arises in the targeted slip rate with respect to the optimal slip rate. For this reason, it is preferable to further provide the first correcting means for correcting the offset amount on the basis of the magnitude of the vehicle deceleration existing during a predetermined period while the control means is reducing the braking force, and to allow the third computing means to compute the wheel speed at the targeted slip rate on the basis of the slip rate computed by the first computing means, the corrected offset amount, and the vehicle speed.

The control means reduces the braking force of the braking device when the actual wheel speed has fallen below the targeted wheel speed, i.e., when the actual slip rate has exceeded the targeted slip rate. However, the difference between the braking torque and the road-surface reactive torque at that time is small in a case where, for instance, the targeted slip rate $\mu$ is lower than the optimal slip rate as compared to a case where the targeted slip rate is equal to the optimal slip rate. In such a case, the wheel deceleration is also small. On the other hand, in a case where the targeted slip rate is greater than the optimal slip rate, the aforementioned difference is large, and the wheel deceleration is also large.

Accordingly, it is possible to determine whether the presently set targeted slip rate is at an appropriate value, on the basis of the wheel deceleration during a period when the control means is reducing the braking force. It should be noted, the first correcting means may correct the offset amount on the basis of the wheel deceleration existing at a point of time when the reduction of the braking force is started by the control means, or may correct the same on the basis of the wheel deceleration existing at a point of time after the lapse of a predetermined time subsequent to the starting of the reduction of the braking force. Consequently, even if the condition of the road surface has changed, it is possible to set an appropriate targeted slip rate by using the corrected offset amount, thereby making it possible to perform optimal braking at all times.

In the event that the condition of the road surface has changed suddenly from a road surface having a low value of the optimal slip rate at which $\mu$ becomes maximum to a road surface having a high value of the optimal slip rate, it is desirable to substantially change the targeted slip rate and the targeted wheel speed within a short time and to effect braking by substantially boosting the braking force. With the above-described control, however, the gain in the increase in the braking force is determined on the basis of the deviation of the actual wheel speed with respect to the targeted wheel speed. If the targeted slip rate is low, the deviation of the wheel speed is small, so that even if the optimal slip rate at which $\mu$ becomes optimum suddenly becomes high, it is difficult to change the values of the targeted slip rate and the targeted wheel speed to optimum values within a short time.

For this reason, it is preferable to further provide the second correcting means for correcting the offset amount such that the offset amount increases if the wheel acceleration existing after the lapse of a predetermined time from the time an increase in the braking force is started by the control means is greater than or equal to a predetermined value, and to allow the third computing means to compute the targeted wheel speed by using the corrected offset amount. If the condition of the road surface has changed from a road surface having a low value of the optimal slip rate at which μ becomes maximum to a road surface having a high value of the optimal slip rate, even in a situation where the control means is boosting the braking force, the wheel acceleration and the wheel speed increase in the positive direction (in the direction of an increase in speed) as in a case where the braking force is reduced. For this reason, even if the slip rate at which μ becomes maximum has suddenly become high for the above reason, the acceleration of the wheel increases by a predetermined value or more. This increase in the acceleration of the wheel is detected and the offset amount is corrected so as to increase. As a result, even in cases where the condition of the road surface has suddenly changed as described above, it is possible to provide optimal braking by following the change.

Meanwhile, if the arrangement provided is such that the braking device applies a braking force to the wheel by the pressure of a fluid, and the control means switches on and off the solenoid valve provided for regulating the pressure of the fluid to be applied to the wheel as the braking force, and controls the braking force (wheel speed) by changing the pressure of the fluid by changing the duty ratio of the on-off operation, if the actual slip rate is controlled to the vicinity of the targeted slip rate through the above-described control, the driving mode of the solenoid valve would be changed two switch the solenoid valve on and off just because the wheel speed has become slightly higher or lower than the targeted wheel speed. In such a case, there arises the problem that noise is frequently generated by the actuation of the solenoid valve, thereby imparting discomfort to the occupant.

If it is unnecessary to change the braking force at high speed when the pressure of the fluid is to be increased or reduced, it is preferable for the control means to switch the solenoid valve on and off with a pattern beginning with off. Incidentally, as a situation for which it is unnecessary to change the braking force at high speed, it is possible to cite, among others, a case where μ is relatively low, and the vehicle deceleration is relatively small. If the solenoid valve is switched on and off in such a situation as described above, the amount of variation of the wheel speed with respect to the targeted wheel speed becomes slightly large. However, if the actual slip rate is being controlled to the vicinity of the targeted slip rate, the frequency at which the solenoid valve is switched on is reduced substantially. Thus, it is possible to prevent the noise generated by the actuation of the solenoid valve from being felt by the occupant as uncomfortable.

It should be noted that although, in the above-described invention, the vehicle speed may be estimated from the wheel speed, if the vehicle speed is detected by using a vehicle-to-ground speed sensor, it is possible to provide control with greater accuracy.

As described above, in the present invention, the arrangement provided is such that the slip rate at a time when the wheel deceleration has become greater than or equal to a predetermined value set on the basis of the vehicle deceleration, the offset amount between the computed slip rate and a targeted slip rate is computed, the wheel speed at the targeted slip rate is computed as the targeted wheel speed on the basis of the computed slip rate, the computed offset amount, and the vehicle speed, and the braking force is controlled such that the wheel speed becomes equal to the computed targeted wheel speed. Accordingly, an outstanding advantage can be obtained in that it is possible to prevent the wheel from becoming locked without impairing the braking performance.

In addition, if the offset amount is computed on the basis of the magnitude of the wheel acceleration existing during a period after the time when the wheel deceleration has become greater than or equal to a predetermined value set in correspondence with the vehicle deceleration, in addition to the above-described advantages, an outstanding advantage can be obtained in that it is possible to provide more appropriate braking in correspondence with the condition of the road surface.

In addition, if the arrangement provided is such that a determination is made as to whether a vibrational change has occurred to the wheel acceleration, the slip rate at a time when the wheel acceleration has become maximal is computed, and if it is determined that the vibrational change has occurred to the wheel acceleration, the targeted wheel speed is computed by setting as the targeted slip rate the slip rate obtained when the computed wheel acceleration has become maximal, in addition to the above-described advantages, an outstanding advantage can be obtained in that it is possible to prevent the deterioration of the braking performance when vibrations of the wheel have occurred.

Further, if the arrangement provided is such that the offset amount is corrected on the basis of the magnitude of the wheel deceleration obtained during a predetermined period while the controlling means is reducing the braking torque, and the wheel speed at the targeted slip rate is computed by using the corrected offset amount, in addition to the above-described advantages, an outstanding advantage can be obtained in that it is possible to set an appropriate targeted slip rate irrespective of the change in the condition of the road surface, and optimal braking can be performed at all times.

Furthermore, if the arrangement provided is such that the offset amount is corrected in such a manner as to increase if the wheel acceleration existing after the lapse of a predetermined time from the time an increase in the braking force is started by the control means is greater than or equal to a predetermined value, and the wheel speed at the targeted slip rate is computed on the basis of the corrected offset amount, the following outstanding advantage can be obtained in addition to the above-described advantages. Namely, in the event that the condition of the road condition has suddenly changed from a road surface having a low value of the slip rate at which μ becomes maximum to a road surface having a high value of the slip rate at which μ becomes maximum, it is possible to provide optimal braking by following the change.

Moreover, if the arrangement provided is such that, if it is unnecessary to change the braking force at high speed when the pressure of the fluid is to be increased or reduced, the control means switches the solenoid valve on and off with a pattern beginning with off, the following outstanding advantage can be obtained in addition to the above-described advantages: Namely, the frequency at which the solenoid valve is switched on is reduced substantially, and it is possible to prevent the noise generated by the actuation of the solenoid valve from being felt by the occupant as uncomfortable.

The above and other objects, features and advantages of the present invention will become more apparent from the following detailed description of the invention when read in conjunction with the accompanying drawings.

BRIEF DESCRIPTION OF THE DRAWINGS

FIG. 9A is a diagram illustrating the magnitude of the offset amount $S_{C1}$ and a targeted slip rate $S_R$ which are set in a case where a µ-S characteristic curve in the second embodiment has a general profile;

FIG. 9B is a diagram illustrating the magnitude of the offset amount $S_{C1}$ and the targeted slip rate $S_R$ which are set in a case where the µ-S characteristic curve in the second embodiment is peaky;

FIG. 9C is a diagram illustrating the magnitude of the offset amount $S_{C1}$ and the targeted slip rate $S_R$ which are set in a case where the µ-S characteristic curve in the second embodiment is gentle;

FIG. 12A is a diagram illustrating the magnitude of an acceleration difference (the magnitude of a wheel acceleration $G_W$) in a case where the targeted slip rate is appropriate;

FIG. 12B is a diagram illustrating the magnitude of the acceleration difference (the magnitude of the wheel acceleration $G_W$) in a case where the targeted slip rate is excessively small;

FIG. 12C is a diagram illustrating the magnitude of the acceleration difference (the magnitude of the wheel acceleration $G_W$) in a case where the targeted slip rate is excessively large;

FIG. 18 is a timing chart in which the change in the mode for driving the solenoid valve when a wheel speed VW is controlled in such a manner as to be substantially equal to a targeted wheel speed $V_R$ is illustrated as a conventional problem.

DESCRIPTION OF THE PREFERRED EMBODIMENTS

Referring now to the accompanying drawings, a detailed description will be given of the embodiments of the present invention.

Figure 3:
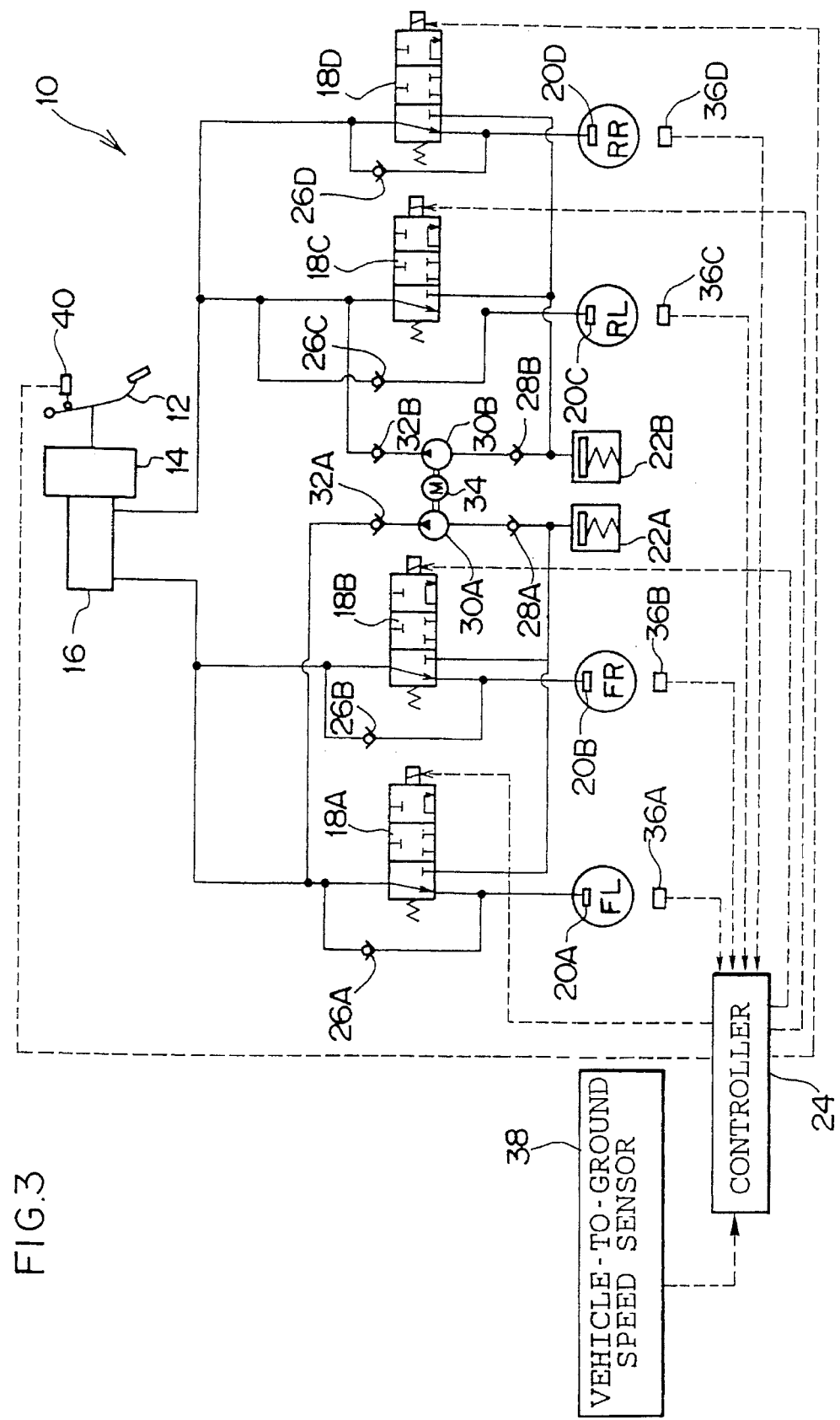
FIG. 3 is a schematic diagram of a braking device in accordance with the embodiments.

FIG. 3 shows a braking device 10 for a vehicle which is comprised of an anti-lock controller in accordance with the present invention. Incidentally, in FIG. 3, the piping for guiding a hydraulic fluid of the braking device 10 is shown by the solid lines, and signal lines are shown by the broken lines. The braking device 10 has a brake pedal 12 disposed in a vehicle compartment, and this brake pedal 12 is connected to a master cylinder 16 via a booster 14. In this embodiment, a tandem-type master cylinder in which two pressurizing chambers are formed in series is used as the master cylinder 16.

One of the two pressurizing chambers in the master cylinder 16 is connected to wheel cylinders 20A and 20B, respectively, which are provided for the left and right front wheels of the vehicle, via solenoid valves 18A and 18B. On the other hand, the other one of the two pressurizing chambers in the master cylinder 16 is connected to wheel cylinders 20C and 20D, which are provided for the left and right rear wheels of the vehicle, via solenoid valves 18C and 18D. A reservoir 22A is connected to the solenoid valves 18A and 18B, while a reservoir 22B is connected to the solenoid valves 18C and 18D. The solenoid valves 18A to 18D are electrically connected to a controller 24 which is comprised of a microcomputer and the like.

The solenoid valves 18A to 18D are normally set in a pressure-boosting state (in the state shown in FIG. 3) in which the solenoid valves 18A to 18D allow the wheel cylinders 20 to communicate with the master cylinder 16 and cut off the same from the reservoirs 22. However, in response to drive signals inputted from the controller 24, the solenoid valves 18A to 18D are capable of being changed over to a pressure-holding state in which the solenoid valves 18A to 18D cut off the wheel cylinders 20 from the master cylinder 16 and the reservoirs 22, or a pressure-reducing state in which the solenoid valves 18A to 18D allow the wheel cylinders 20 to communicate with the reservoirs 22 and cut off the same from the master cylinder 16.

It should be noted that although, in FIG. 3, the solenoid valves 18A to 18D are shown as being three-way valves for clarity, each of the solenoid valves 18A to 18D is comprised of a combination of a pressure-boosting valve constituted by a normally-open solenoid valve and a pressure-reducing valve constituted by a normally-closed solenoid valve. When the energization of the pressure-boosting valve and the pressure-reducing valve is being stopped, each solenoid valve is set in the pressure-boosting state. When only the pressure-boosting valve is energized, each solenoid valve is set in the pressure-holding state. When both the pressure-boosting valve and the pressure-reducing valve are energized, each solenoid valve is set in the pressure-reducing state. Hereafter, signals that are outputted from the controller 24 to set the solenoid valve in the pressure-boosting state, the pressure-holding state, and the pressure-reducing state will be referred to as the pressure-boosting signal, the pressure-holding signal, and the pressure-reducing signal, respectively.

Check valves 26A to 26D are provided between the master cylinder 16 and the wheel cylinders 20A to 20D in parallel with the solenoid valves 18A to 18D, respectively. These check valves 26A to 26D prevent the pressure of the hydraulic fluid (corresponding to a braking force) within the wheel cylinders 20 from becoming higher than the liquid pressure within the pressurizing chambers. In addition, the reservoir 22A is connected to the master cylinder 16 via a check valve 28A, a pump 30A, and a check valve 32A. Similarly, the reservoir 22B is connected to the master cylinder 16 via a check valve 28B, a pump 30B, and a check valve 32B. The pumps 30A and 30B are driven by a motor 34, and the hydraulic fluid in the reservoirs 22A and 22B is sucked up by the pumps 30A and 30B and is supplied to the master cylinder 16.

Rotating members (not shown) which rotate with the four wheels mounted on the vehicle are attached to the wheels, respectively. Wheel speed sensors 36A to 36D for detecting a wheel speed $V_W$ by detecting the rotational speeds of the rotating members are provided in the vicinities of the rotating members. The wheel speed sensors 36A to 36D are respectively connected electrically to the controller 24 to output the results of detection to the controller 24. In addition, a vehicle-to-ground speed sensor 38 is mounted on the vehicle. The vehicle-to-ground speed sensor 38 is of an ultrasonic Doppler type or a spatial filter type, and detects a vehicle-to-ground speed $V_{GS}$ of the vehicle. The vehicle-to-ground speed sensor 38 is electrically connected to the controller 24 to output the detected vehicle-to-ground speed (vehicle speed) $V_{GS}$ to the controller 24. In addition, a brake switch 40, which is turned on if the brake pedal 12 is depressed by a driver, is electrically connected to the controller 24.

Next, referring to the flowcharts shown in FIGS. 4 and 5, a description will be given of the operation of this first embodiment. In Step 100 of the flowchart in FIG. 4, various flags and the like are initialized. In Step 102, the vehicle speed $V_{GS}$ detected by the vehicle-to-ground speed sensor 38 is fetched. Further, in Step 104, a vehicle acceleration $G_{GS}$ is computed on the basis of the vehicle speed $V_{GS}$ fetched in Step 102. Here, the vehicle acceleration $G_{GS}$ represents an amount of change (positive or negative) per unit time of the vehicle speed, and in the case of a deceleration (in a case where $G_{GS}$ is negative), it is referred to as the vehicle deceleration.

In an ensuing Step 106, wheels that are subject to processing in Step 108 and thereafter are determined. In Step 108, the rotational speed of the rotating member, which was detected by the wheel speed sensor 36 corresponding to the wheel subject to processing, is fetched to compute a wheel speed $V_W$. In Step 110, a wheel acceleration $G_W$ is computed on the basis of the wheel speed $V_W$ fetched in Step 108. Here, the wheel acceleration $G_W$ represents an amount of change (positive or negative) per unit time of the wheel speed, and in the case of a deceleration (in a case where $G_W$ is negative), it is referred to as the wheel deceleration. In Step 112, a targeted wheel speed $V_R$ is computed. Hereafter, a description will be given of processing for computing this targeted wheel speed $V_R$ with reference to the flowchart shown in FIG. 5.

In Step 150, a determination is made as to whether the brake switch 40 is on, i.e., whether the brake pedal 12 has been operated. If NO is the answer in the determination in Step 150, an initial value $S_{INIT}$ set in advance as a reference slip rate $S_P$ is set in Step 160. A value which is higher (e.g., by 30% or thereabouts) than the slip rate in which μ becomes maximum on a general road surface is set as the initial value $S_{INIT}$. As a result, during braking on a special road surface (e.g., on a gravel road or the like) where the optimum slip rate at which μ becomes maximum is very high, it is possible to prevent it from taking time until the optimum slip rate is reached.

In an ensuing Step 170, a "0" is set as an initial value of an offset amount $S_{C1}$, and the operation proceeds to Step 230. In Step 230, the targeted wheel speed $V_R$ is computed in accordance with the following Formula (3):

$$V_R = V_{GS} \times (1 - (S_P + S_{C1})) \tag{3}$$

It should be noted that, in Formula (3) above, $(S_P + S_{C1})$ corresponds to the targeted slip rate. Accordingly, if the brake pedal 12 has not been operated, the targeted wheel speed $V_R$ is computed by setting the initial value $S_{INIT}$ of the reference slip rate $S_P$ as the targeted slip rate.

Meanwhile, if YES is the answer in the determination in Step 150, a determination is made in Step 180 as to whether control of the braking torque (brake pressure) is already being effected. If NO is the answer in the determination in Step 180, the operation proceeds to Step 200. On the other hand, if YES is the answer in the determination in Step 180, a determination is made in Step 190 as to whether control is being effected for boosting pressure, i.e., whether the brake pressure is being controlled to increase the brake pressure. If NO is the answer in the determination in Step 180, the operation proceeds to Step 230, but if YES is the answer in the determination in Step 190, the operation proceeds to Step 200.

In Step 200, a determination is made as to whether during the previous control period the wheel acceleration $G_W$ was greater than a predetermined value $G_2$ (a negative value) (i.e., the wheel deceleration was smaller than the absolute value of the predetermined value $G_2$), and whether during the most recent control period the wheel acceleration $G_W$ has become less than or equal to the predetermined value $G_2$ (i.e., the wheel deceleration has become greater than or equal to the absolute value of the predetermined value $G_2$). Incidentally, the predetermined value $G_2$ is calculated on the basis of the vehicle acceleration $G_{GS}$ in accordance with the following Formula (4), but since the vehicle is decelerating while the brake switch is on, $G_{GS}$ represents a negative value, i.e., the vehicle deceleration:

$$G_2 = G_{GS} - G_K \tag{4}$$

Figure 1A:
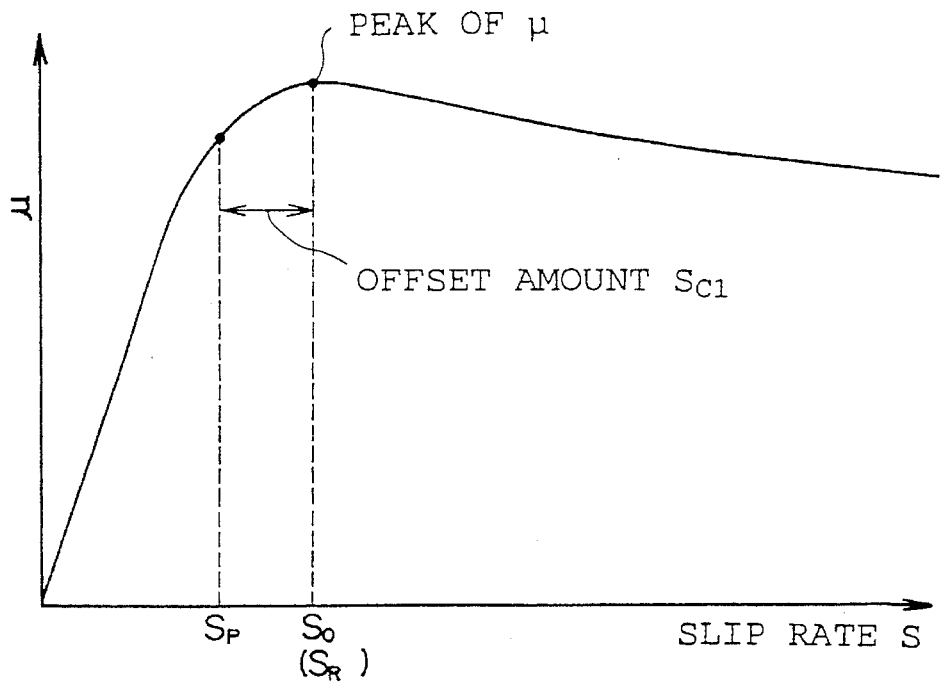
FIG. 1A is a diagram illustrating the change of μ with respect to the change of a slip rate S.
Figure 1B:
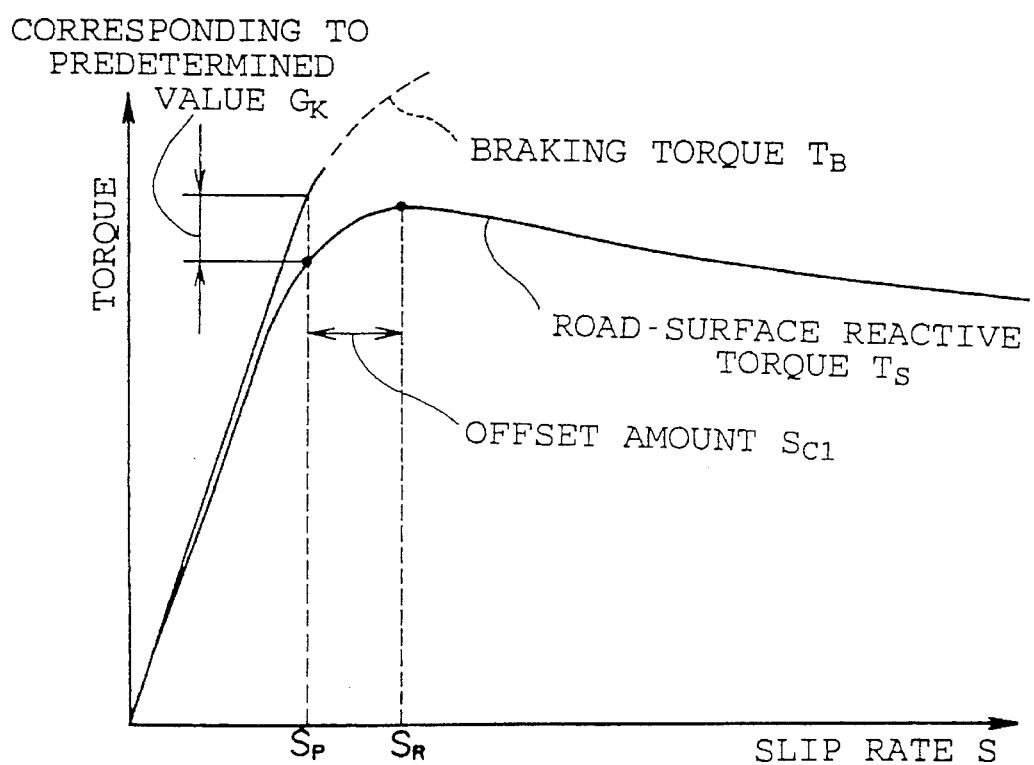
FIG. 1B is a diagram illustrating the changes of road-surface reactive torque $T_S$ and braking torque $T_B$ with respect to the change of the slip rate.

Here, $G_K$ (see FIG. 1B as well) is a constant, and a value of, for instance, 1G or thereabouts is set. Incidentally, it is preferable to change the value of $G_K$ in correspondence with the inertia of the wheel. In the case of the wheel having small inertia, such as a nondriving wheel, the wheel deceleration is large with respect to an identical braking torque (the wheel speed $V_W$ is liable to drop), as is apparent from Formula (2).

Accordingly, if the value of $G_K$ is made large with respect to such a wheel, it is possible to correct the fact that the timing at which the result of determination in Step 200 changes from NO to YES changes in correspondence with the relative magnitude of the inertia of the wheel.

Figure 6:
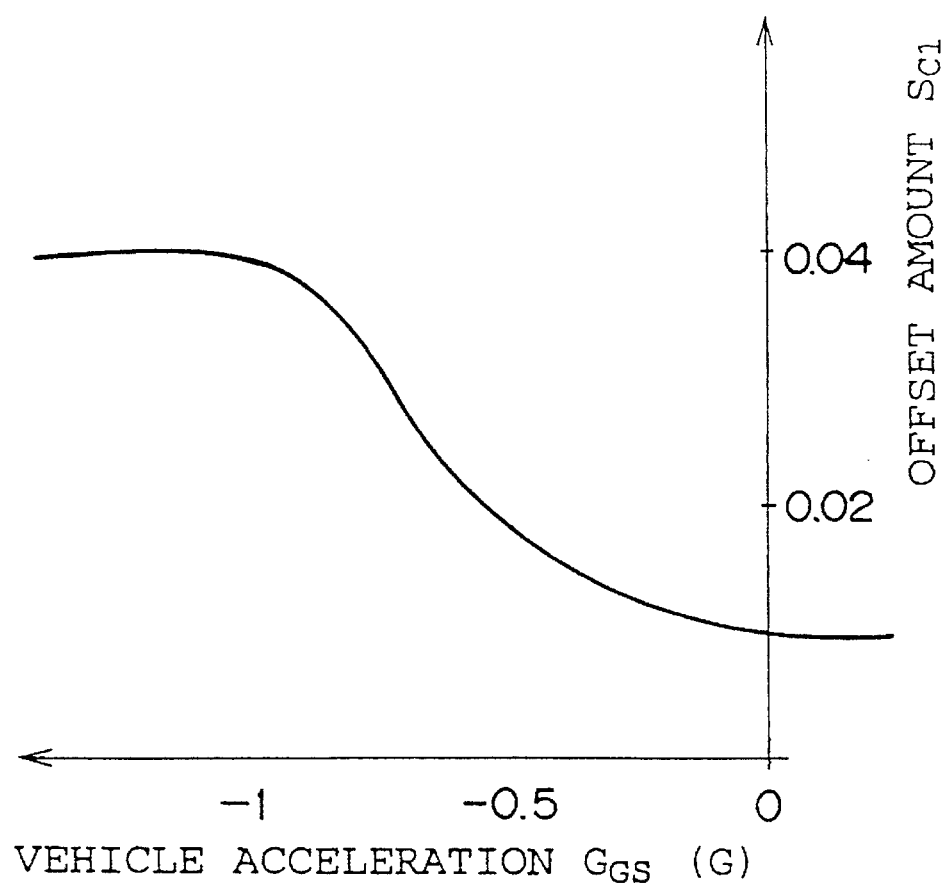
FIG. 6 is a diagram illustrating the contents of a map for setting an offset amount $S_{C1}$ in the first embodiment.

If NO is the answer in the determination in Step 200, the operation proceeds to Step 230. On the other hand, if YES is the answer in the determination in Step 200, in Step 210, a slip rate S at this point of timing is computed as the reference slip rate $S_P$ in accordance with Formula (1). In an ensuing Step 220, the offset amount $S_{C1}$ is computed on the basis of the vehicle acceleration $G_{GS}$ (vehicle deceleration). In this first embodiment, the relationship between the vehicle acceleration $G_{GS}$ and the offset amount $S_{C1}$ is stored in advance as a map, as shown in FIG. 6, so that the offset amount $S_{C1}$ can be derived by referring to this map. In an ensuing Step 230, the targeted wheel speed $V_R$ is computed in accordance with Formula (3) as described above. Since the reference slip rate $S_P$ and the offset amount $S_{C1}$, which were respectively computed in Steps 210 and 220, are used in Step 230, the wheel speed at a slip rate $S_R$ (see FIG. 1) at which μ becomes maximum is set as the targeted wheel speed $V_R$.

Figure 4:
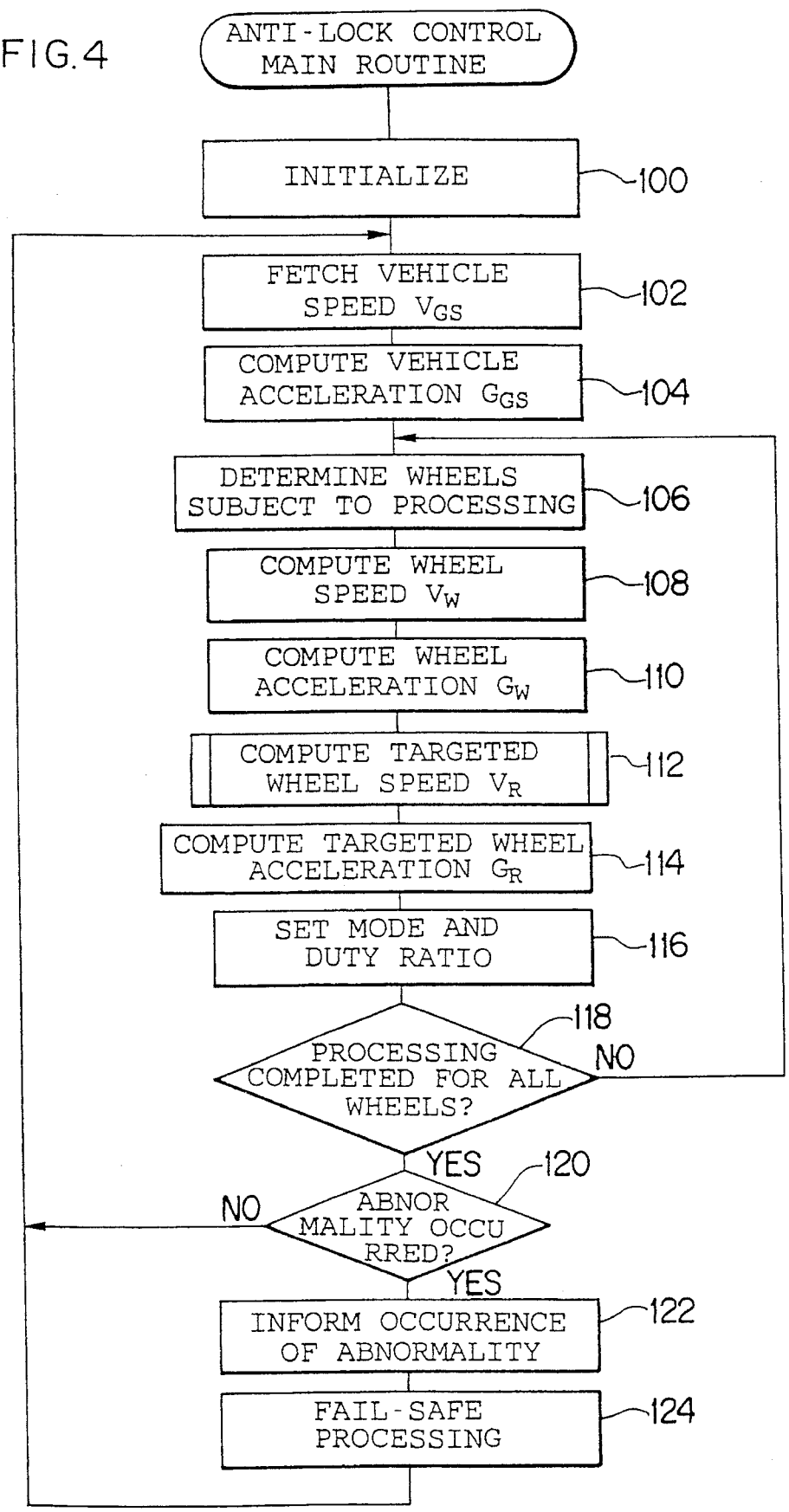
FIG. 4 is a flowchart explaining an outline of anti-lock control.
Figure 5:
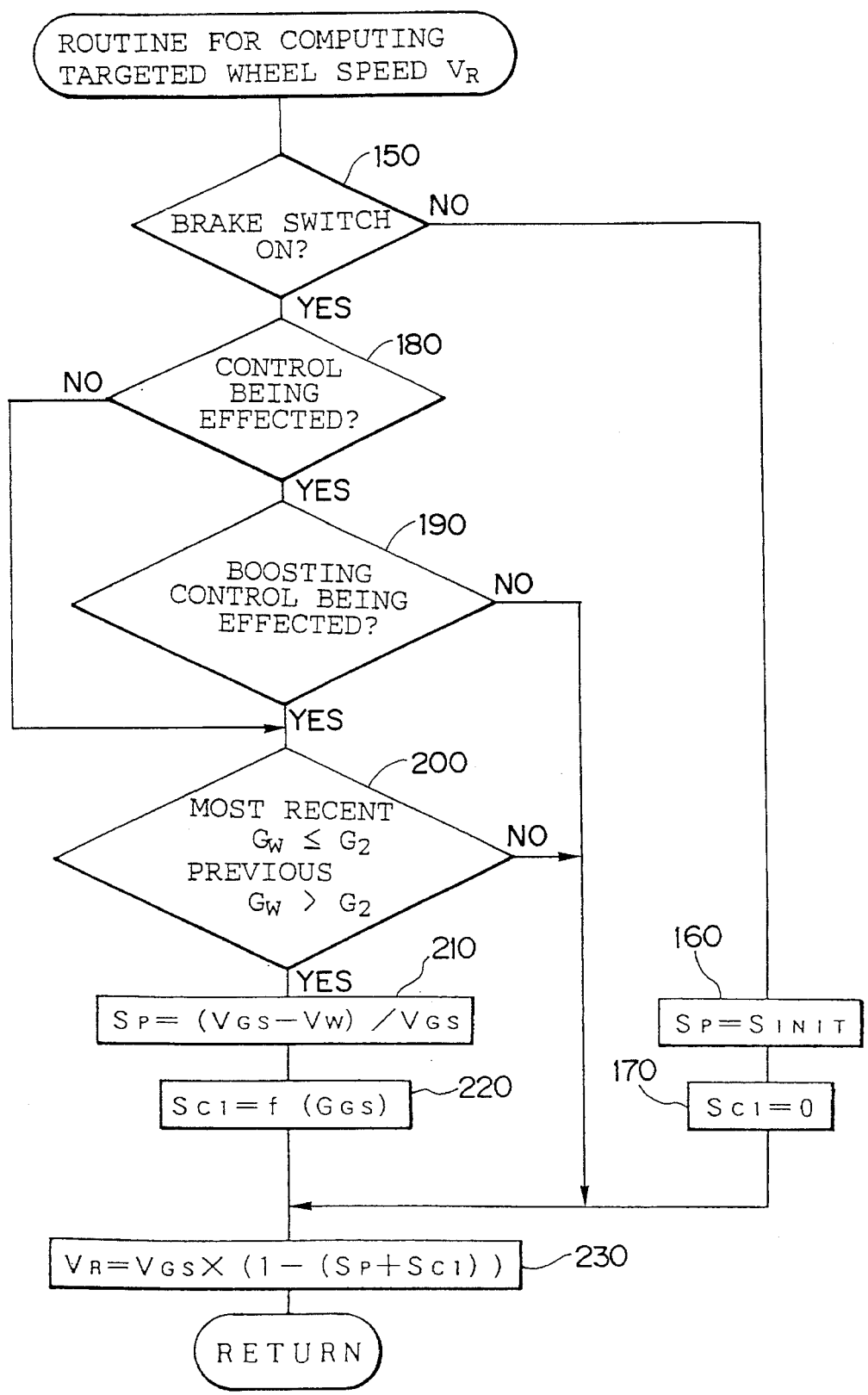
FIG. 5 is a flowchart explaining the processing for computing the targeted wheel speed in accordance with a first embodiment.

After the targeted wheel speed $V_R$ is computed in the above-described manner, the operation proceeds to Step 114 in the flowchart shown in FIG. 4, to compute a targeted wheel acceleration $G_R$ by differentiating the targeted wheel speed $V_R$ (specifically, by subtracting the targeted wheel speed $V_R$ computed during the most recent control period from the value of the targeted wheel speed $V_R$ computed during the previous control period). In an ensuing Step 116, the mode and the duty ratio are set by comparing the targeted wheel speed $V_R$ and the targeted wheel acceleration $G_R$ with the wheel speed $V_W$ and the wheel acceleration $G_W$, respectively. The mode is set in accordance with the following Table 1.

TABLE 1

| | $G_W < G_R$ | $G_W > G_R$ |
|---|---|---|
| $V_W > V_R$ | pressure-boosting mode | |
| $V_W < V_R$ | pressure-reducing mode | pressure-holding mode |

It should be noted the pressure-boosting mode is a mode in which the brake pressure is boosted to increase the braking torque, the pressure-reducing mode is a mode in which the brake pressure is reduced to decrease the braking torque, and the pressure-holding mode is a mode in which the boosting or reducing of the brake pressure is stopped to hold the braking toque at a fixed value. In Table 1, a setting is provided such that in a case where the wheel acceleration $G_W$ has become greater than the targeted wheel acceleration $G_R$ (or smaller than the targeted wheel acceleration $G_R$ in the case of the deceleration) despite the fact the wheel speed $V_W$ is smaller than the targeted wheel speed $V_R$, the pressure-reducing mode is stopped, and the pressure-holding mode is executed. This setting is provided to prevent an excessive pressure reduction, because it is unnecessary to reduce the brake pressure after the wheel acceleration $G_W$ has become equal to the targeted wheel acceleration $G_R$ by pressure reduction, and the dynamic stability in the motion of the wheel has been established.

In addition, the setting of the duty ratio is provided such that as the difference between the wheel speed $V_W$ and the targeted wheel speed $V_R$, or the difference between the wheel acceleration $G_W$ and the targeted wheel acceleration $G_R$, becomes greater, the rate of the on time of the solenoid valve in a unit time (i.e., the duty ratio) becomes higher. Consequently, as the aforementioned difference becomes greater, the inclination of the slope of boosting or reducing the brake pressure is set to be larger.

In an ensuing Step 118, a determination is made as to whether the processing of Steps 108 to 116 has been effected with respect to all the wheels of the vehicle. If NO is the answer in the determination in Step 118, the operation returns to Step 106, to repeat the foregoing processing by changing the wheel subject to processing. The modes and the duty ratios, which are set as described above, are stored in a memory or the like. In a brake-pressure control routine, which is executed separately from the processing shown in FIGS. 4 and 5, the modes and the duty ratios stored in the memory or the like are constantly monitored, and the pressure-boosting signal, the pressure-reducing signal, or the pressure-holding signal is outputted to the solenoids of the solenoid valves 18A to 18D in correspondence with the stored modes and duty ratios.

Meanwhile, in the flowchart shown in FIG. 4, if processing is effected for all the wheels, the operation proceeds to Step 120 to determine whether an abnormality has occurred in the braking device 10. If NO is the answer in the determination in Step 120, the operation returns to Step 102 to repeatedly execute the above-described processing. On the other hand, if an abnormality has occurred in the braking device 10, in Step 122, a lamp provided on an instrument panel or the like is lit to inform the occupant of the occurrence of the abnormality. In Step 124, fail-safe processing is carried out, and the operation returns to Step 102.

Thus, in the above-described processing, since the targeted slip rate $S_R$ at which μ becomes maximum is estimated before μ becomes maximum, and control is provided to allow an actual slip rate to become equal to the targeted slip rate $S_R$, the braking performance of the braking device 10 is not impaired in detecting the peak of μ.

Figure 7:
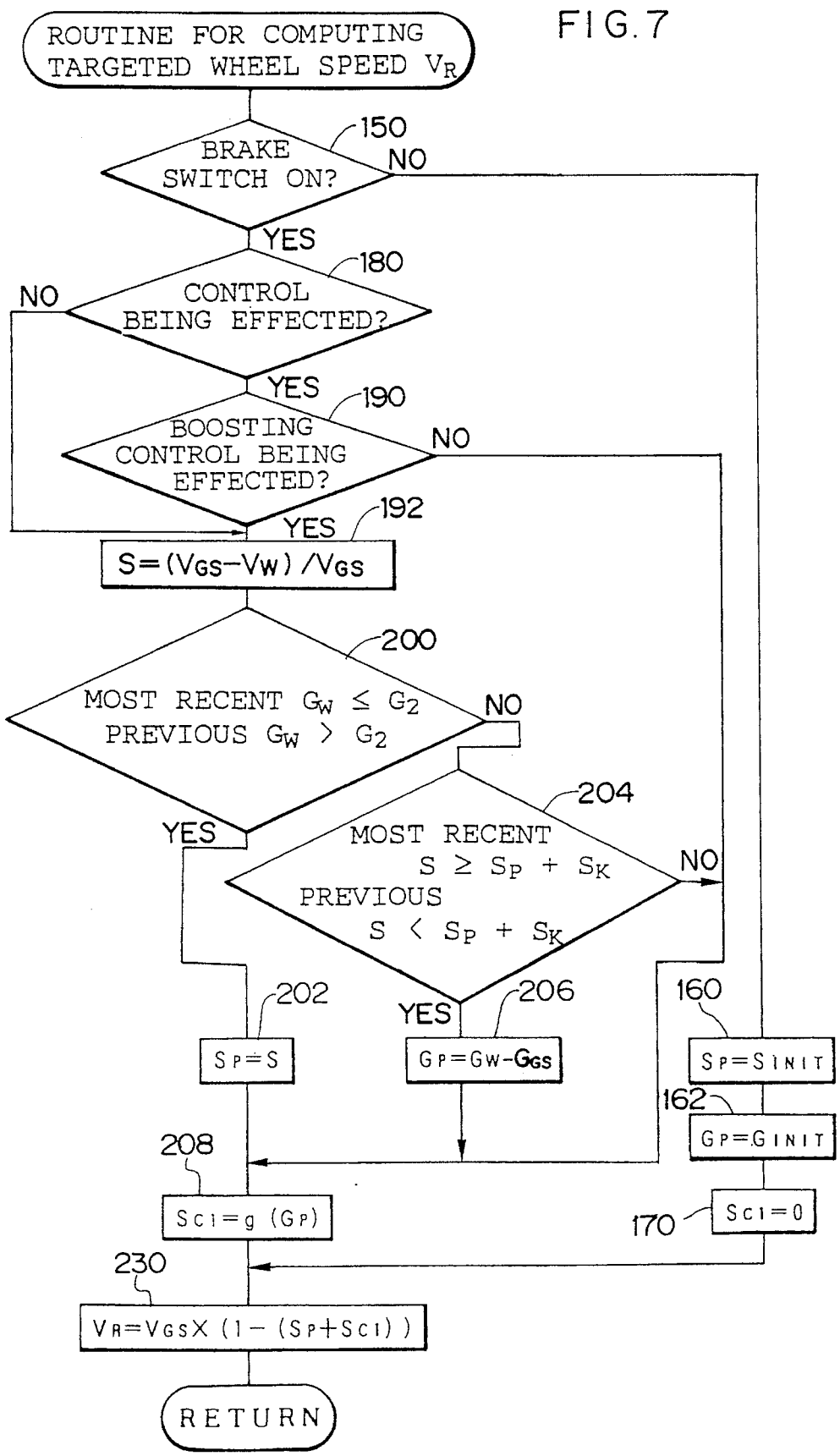
FIG. 7 is a flowchart explaining the processing for computing the targeted wheel speed in accordance with a second embodiment.

Next, a description will be given of a second embodiment of the present invention. Since the arrangement of the second embodiment is substantially similar to that of the first embodiment, a detailed description thereof will be omitted. Hereafter, referring to the flowchart shown in FIG. 7, a description will be given of those portions that differ from the first embodiment in the processing for computing the targeted wheel speed in accordance with the second embodiment.

In the processing for computing the targeted wheel speed in accordance with the second embodiment, in the case where the brake switch 40 is off (NO is the answer in the determination in Step 150), in addition to the initialization of the reference slip rate $S_P$ in Step 160 and the initialization of the offset amount $S_{C1}$ in Step 170, data $G_P$ (hereafter referred to as the acceleration difference $G_P$) representing the difference between the wheel acceleration $G_W$ and the vehicle acceleration $G_{GS}$ is set as an initial value $G_{INIT}$ in Step 162. In this second embodiment, since the offset amount $S_{C1}$ is calculated on the basis of the acceleration difference $G_P$, as will be described later, the initial value $G_{INIT}$ is set such that the calculated value of the offset amount $S_{C1}$ does not become a "0," i.e., such that the targeted wheel speed $V_R$ will not be computed by setting the reference slip rate $S_P$ as the targeted slip rate.

On the other hand, if NO is the answer in the determination in Step 180, or if YES is the answer in the determination in Step 190, in Step 192, the slip rate S is computed on the basis of the wheel speed $V_W$ and the vehicle speed $V_{GS}$ in accordance with Formula (1), and the operation proceeds to Step 200. If the wheel acceleration $G_W$ is not lower than or equal to the predetermined value $G_2$, NO is given as the answer in the determination in Step 200, and the operation proceeds to Step 204. In Step 204, by comparing the slip rate S computed in Step 192 with a reference value in which a predetermined value $S_K$ is added to the reference slip rate $S_P$, a determination is made as to whether during the previous control period the slip rate was less than the aforementioned reference value and whether during the most recent control period the slip rate has become greater than or equal to the aforementioned reference value.

Figure 8:
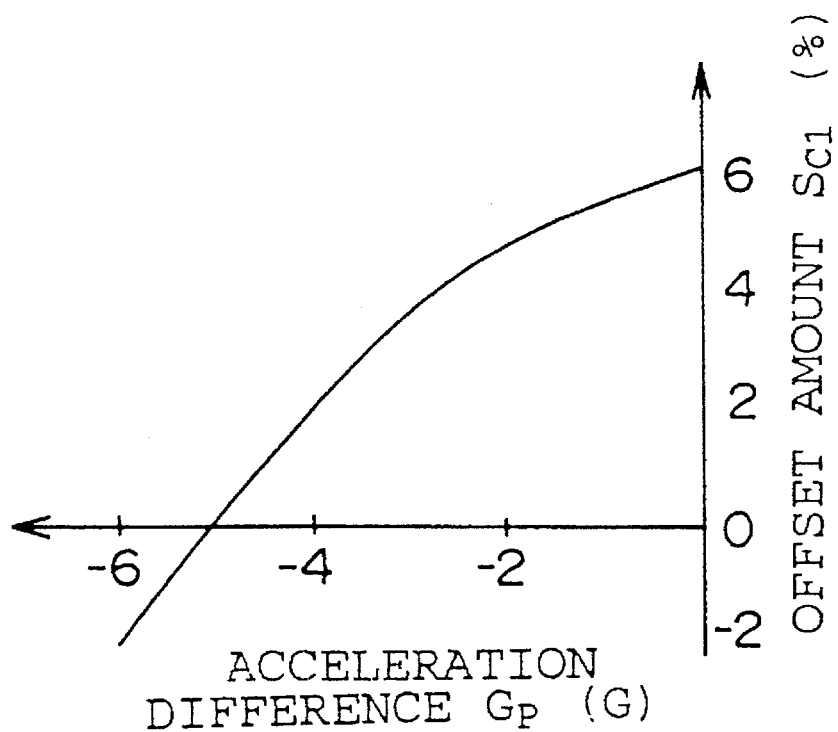
FIG. 8 is a diagram illustrating the contents of a map for setting the offset amount $S_{C1}$ in the second embodiment.

If NO is the answer in the determination in Step 204, in Step 208, the offset amount $S_{C1}$ is computed on the basis of the aforementioned acceleration difference $G_P$. In this second embodiment, the relationship between the acceleration difference $G_P$ and the offset amount $S_{C1}$ is stored in advance as a map, as shown in FIG. 8, so that the offset amount $S_{C1}$ is computed in Step 208 by referring to this map. In the above-described processing, in the case where the brake switch 40 is turned on, and the wheel acceleration $G_W$ is greater than the initial value $G_2$ (i.e., the wheel deceleration is smaller than the absolute value of the predetermined value $G_2$), the targeted wheel speed $V_R$ is computed on the basis of the initial value of the reference slip rate $S_P$ as well as the offset amount $S_{C1}$ determined on the basis of the initial value of the acceleration difference $G_P$.

On the other hand, YES is given as the answer in the determination in Step 200 if the wheel acceleration $G_W$ becomes less than or equal to the predetermined value $G_2$ (i.e., the wheel deceleration becomes greater than or equal to the absolute value of the predetermined value $G_2$). In this case, in Step 202, the slip rate S computed in Step 192 is set as the reference slip rate $S_P$, and the operation proceeds to Step 208. Accordingly, if the wheel acceleration $G_W$ becomes less than or equal to the predetermined value $G_2$, the targeted wheel speed $V_R$ is computed on the basis of the slip rate obtained when the wheel acceleration $G_W$ became less than or equal to the predetermined value $G_2$, as well as the offset amount $S_{C1}$ determined on the basis of the initial value of the acceleration difference $G_P$. Further, if the slip rate S becomes greater than or equal to the reference value in which the predetermined value $S_K$ is added to the reference slip rate $S_P$, YES is given as the answer in determination in Step 204. In this case, in Step 206, a value in which the vehicle acceleration $G_{GS}$ is subtracted from the wheel acceleration $G_W$ is see as the acceleration difference $G_P$. Consequently, in Step 208, the offset amount $S_{C1}$ is newly computed on the basis of the acceleration difference $G_P$ set in Step 206, and the targeted wheel speed $V_R$ is computed by using the newly computed offset amount $S_{C1}$.

As is apparent from FIG. 8, the value of the offset amount $S_{C1}$ is set in such a manner as to become smaller as the acceleration difference $G_P$ becomes smaller, i.e., as the deceleration difference becomes greater. Accordingly, in a case where, as shown in FIG. 9B, the profile of an actual μ-S characteristic curve is peaky (i.e., the profile of the crest whose vertex is a point at which μ is maximum is steep) as compared to a general μ-S characteristic curve shown in FIG. 9A, the value of the acceleration difference $G_P$ is small. Therefore, the value of the offset amount $S_{C1}$ is set to be small correspondingly. On the other hand, in a case where the profile of the actual μ-S characteristic curve is gentle (i.e., the profile of the crest is gentle), as shown in FIG. 9C, the value of the acceleration difference $G_P$ is large, so that the value of the offset amount $S_{C1}$ is set to be large correspondingly. Accordingly, it is possible to improve the accuracy of the targeted slip rate $S_R$ with respect to the slip rate at which μ becomes maximum, and more appropriate braking is carried out in correspondence with the condition of the road surface.

Figure 10:
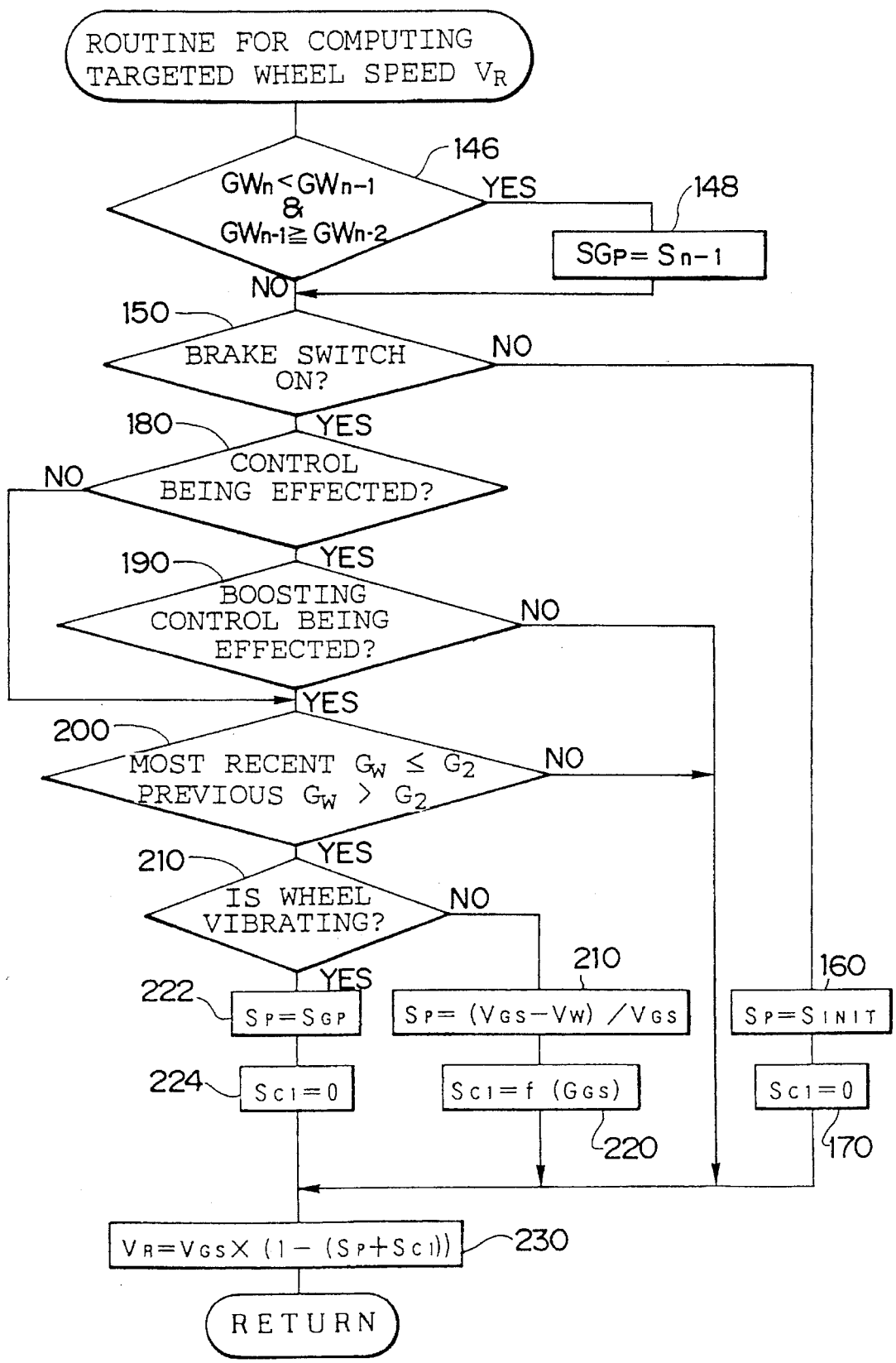
FIG. 10 is a flowchart explaining the processing for computing the targeted wheel speed in accordance with a third embodiment.

Next, a description will be given of a third embodiment of the present invention. Since the arrangement of the third embodiment is also substantially similar to that of the first embodiment, a detailed description thereof will be omitted. Hereafter, referring to the flowchart shown in FIG. 10, a description will be given of only those portions that differ from the first embodiment with respect to the processing for computing the targeted wheel speed in accordance with the third embodiment.

Figure 2A:
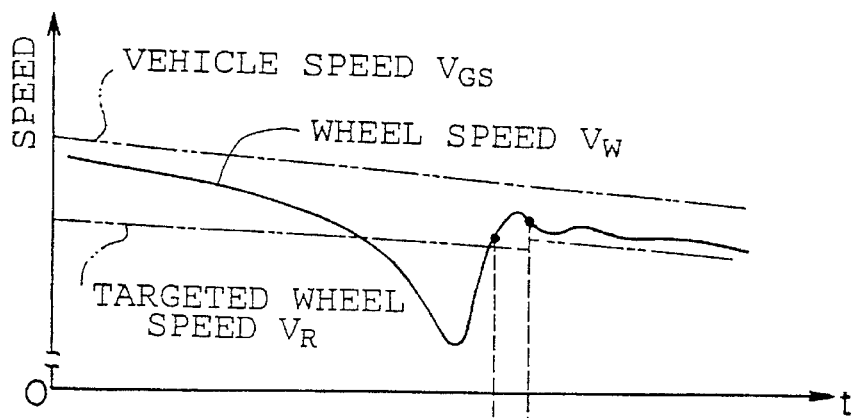
FIG. 2A is a diagram illustrating a wheel speed at a time when vibrations of the wheel have occurred.
Figure 2B:
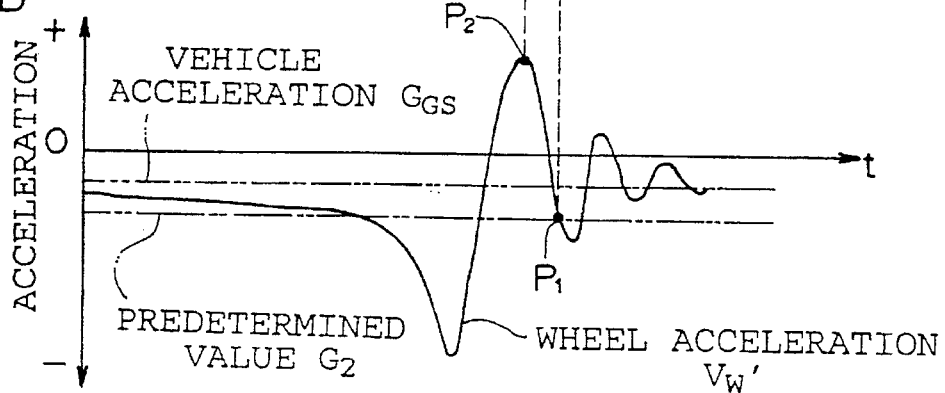
FIG. 2B is a diagram illustrating a wheel acceleration at a time when vibrations of the wheel have occurred.
Figure 2C:
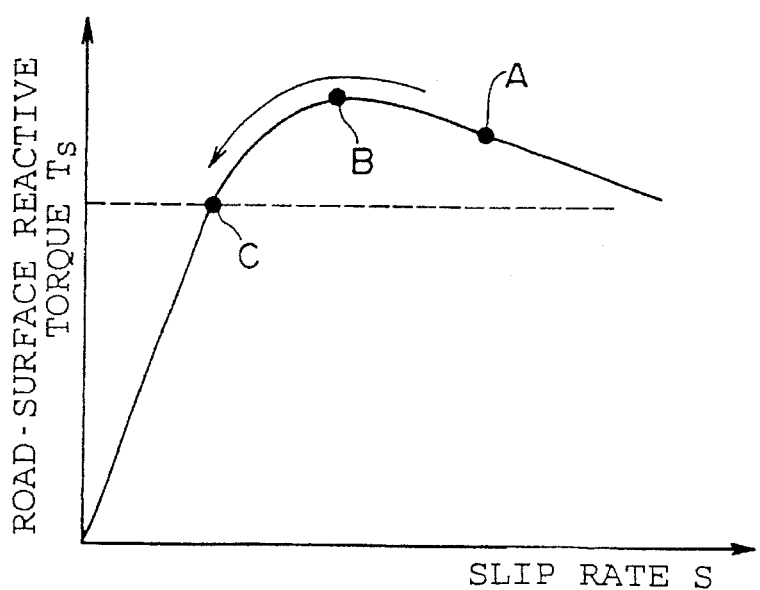
FIG. 2C is a diagram illustrating the change of the road-surface reactive torque $T_S$ at a time when vibrations of the wheel have occurred.

In the third embodiment, in Step 146, a determination is first made as to whether a wheel acceleration $G_{W(n-1)}$ computed in the previous control period was at a peak (a maximal value; see point $P_2$ in FIG. 2B) in the positive direction of the wheel acceleration $G_W$. This determination is made by determining whether a wheel acceleration $G_{W(n)}$ during the most recent control period was less than the wheel acceleration $G_{W(n-1)}$ during the previous control period, and whether the wheel acceleration $G_{W(n-1)}$ during the previous control period was greater than or equal to a wheel acceleration $G_{W(n-2)}$ during the control period preceding the previous control period. If NO is the answer in the determination in Step 146, the operation proceeds to Step 150, but if YES is the answer in the determination in Step 146, in Step 148, a slip rate $S_{(n-1)}$ during the previous control period is stored as a slip rate $S_{GP}$, and then the operation proceeds to Step 150.

Accordingly, as the processing for computing the targeted wheel speed is repeatedly executed, the slip rate at a peak in the positive direction of the most recent wheel acceleration $G_W$ is always set as the slip rate $S_{GP}$.

In addition, in the third embodiment, if YES is the answer in the determination in Step 200, in Step 210, a determination is made as to whether the wheel is vibrating, i.e., whether a vibrational change has occurred to the acceleration of the wheel. The presence or absence of the occurrence of the vibrations of the wheel can be determined by monitoring, for instance, a change over time of the wheel acceleration $G_W$ and on the basis of the period and amplitude thereof. If NO is the answer in the determination in Step 201, in the same way as in the first embodiment, the determinations in Steps 210 and 220 are made, and the operation proceeds to Step 230. If YES is the answer in the determination in Step 201, on the other hand, in Step 222, the aforementioned slip rate $S_{GP}$ is set as the reference slip rate $S_P$. Then, in Step 224, the offset amount $S_{C1}$ is set to a "0" in Step 224, and the operation proceeds to Step 230.

In the event that vibrations of the wheel have occurred, a road-surface reactive torque $T_S$ changes until it balances with the reduced braking torque as the braking torque is reduced, but the wheel acceleration $G_W$ becomes a maximum value in the positive direction at the slip rate in which μ becomes maximum. Accordingly, in the above-described processing, even if the vibrations of the wheel occur, the slip rate at which μ becomes maximum is set as the targeted slip rate $S_R$, and the targeted wheel speed $V_R$ is computed on the basis of this targeted slip rate $S_R$. Hence, it is possible to prevent the deterioration of the braking performance.

Figure 11:
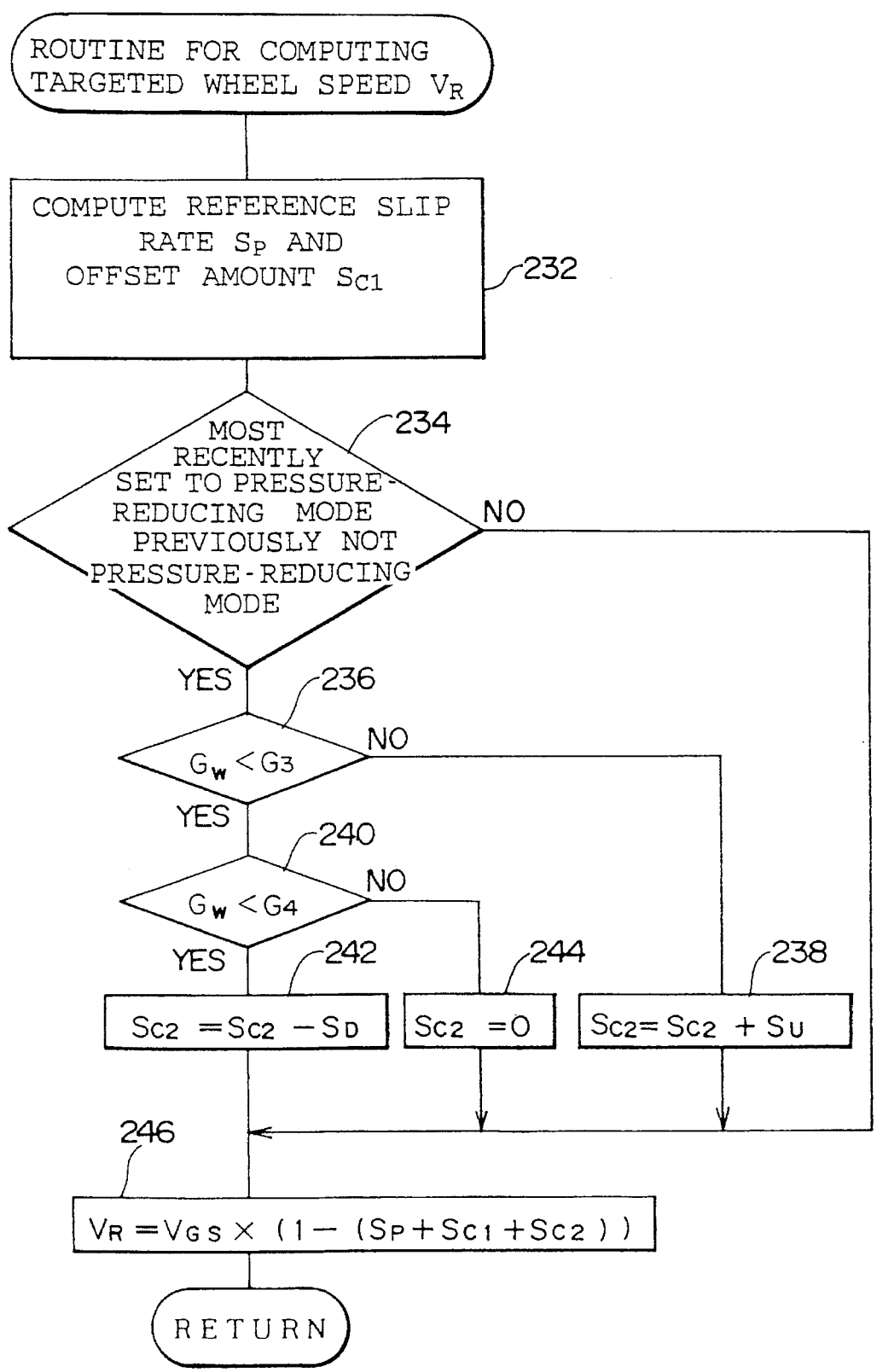
FIG. 11 is a flowchart explaining the processing for computing the targeted wheel speed in accordance with a fourth embodiment.

Next, a description will be given of a fourth embodiment of the present invention. Since the arrangement of the fourth embodiment is also substantially similar to that of the first embodiment, a detailed description thereof will be omitted. Hereafter, referring to the flowchart shown in FIG. 11, a description will be given of the processing for computing the targeted wheel speed in accordance with the fourth embodiment.

In Step 232, the reference slip rate $S_P$ and the offset amount $S_{C1}$ are computed. Specifically, this computing operation can be realized by effecting the processing which precedes Step 230 in any of the routines for computing the targeted wheel speed which have been described in the first to third embodiments. In an ensuing Step 234, a determination is made as to whether the mode which was set in the previous control period was not the pressure-reducing mode and the mode which has been set in the most recent control period is the pressure-reducing mode, i.e., whether the mode has been changed over to the pressure-reducing mode. As described in the first embodiment, the changeover to the pressure-reducing mode is made if the wheel speed $V_W$ becomes less than the targeted wheel speed $V_R$, or if the wheel acceleration $G_W$ becomes less than the targeted wheel acceleration $G_R$.

If NO is the answer in the determination in Step 234, in Step 246, the targeted wheel speed $V_R$ is computed in accordance with the following Formula (5):

$$V_R = V_{GS} \times (1 - (S_P + S_{C1} + S_{C2})) \qquad (5)$$

where $S_{C2}$ is a correction amount for correcting the offset amount $S_{C1}$, and is initialized to a "0" in Step 100 in the flowchart shown in FIG. 4.

Meanwhile, if YES is the answer in the determination in Step 234, in Step 236, a determination is made as to whether the wheel acceleration $G_W$ is less than a reference value $G_3$ which is set as an upper limit of the wheel acceleration (a lower limit in the wheel deceleration). The reference value $G_3$ can be determined by subtracting a predetermined value (e.g., 0.5G) from the vehicle acceleration $G_{GS}$. If NO is the answer in the determination in Step 236, since the wheel deceleration is small, and the acceleration difference $G_P$ is small as shown in FIG. 12B, it can be determined that the targeted slip rate $S_R$ is excessively small with respect to the appropriate slip rate at which μ becomes maximum. Incidentally, in FIGS. 12A to 12C, the difference between the road-surface reactive torque and the braking torque is shown as the acceleration difference $G_P$ for clarity. Accordingly, if NO is the answer in the determination in Step 236, in Step 238, a predetermined value $S_U$ is added to the correction amount $S_{C2}$, and the operation proceeds to Step 246.

It should be noted that the predetermined value $S_U$ may be set as a fixed value, or may be varied as the absolute value of the wheel acceleration $G_W$, or the magnitude of the acceleration deceleration $G_P$, becomes smaller. Since the targeted slip rate $S_R$ corresponds to $S_P + S_{C1} + S_{C2}$ in Formula (5), the addition of the predetermined value $S_U$ to the correction amount $S_{C2}$ in Step 238 means that correction has been provided such that the value of the targeted slip rate $S_R$ becomes large.

On the other hand, if YES is the answer in the determination in Step 236, in Step 240, a determination is made whether the wheel acceleration $G_W$ is less than a reference value $G_4$ which is set as a lower limit of the wheel acceleration (an upper limit of the wheel deceleration). The reference value $G_4$ is determined by subtracting from the vehicle acceleration $G_{GS}$ a predetermined value (e.g., 2.0G) which is greater than the predetermined value used in the reference value $G_3$. If NO is the answer in the determination in Step 240, since the wheel deceleration is large, and the acceleration difference $G_P$ is large as shown in FIG. 12C, it can be determined that the targeted slip rate $S_R$ is excessively large with respect to the appropriate slip rate at which μ becomes maximum.

For this reason, if NO is the answer in the determination in Step 240, in Step 242, a predetermined value $S_D$ is subtracted from the correction amount $S_{C2}$, and the operation proceeds to Step 246. Incidentally, the predetermined value $S_D$ may be set as a fixed value, or may be varied as the absolute value of the wheel acceleration $G_W$, or the magnitude of the acceleration deceleration $G_P$, becomes larger. Consequently, it follows that correction is provided such that the value of the targeted slip rate $S_R$ becomes small.

In addition, if NO is the answer in the determination in Step 240, since the wheel acceleration $G_W$ is less than the predetermined value $G_3$, and is greater than or equal to the predetermined value $G_4$, a determination is made that the targeted slip rate $S_R$ is appropriate, as shown in FIG. 12A. Thus, in Step 244, the correction amount $S_{C2}$ is set to a "0," and the operation proceeds to Step 246.

In the above-described processing, even if the condition of the road surface has changed, the targeted slip rate $S_R$ is corrected by the correction amount $S_{C2}$ which is set on the basis of the wheel acceleration $G_W$ obtained when the mode was changed over to the pressure-reducing mode, and the targeted wheel speed $V_R$ is computed on the basis of the corrected targeted slip rate $S_R$. Hence, optimal braking can always be performed even if the condition of the road surface has changed.

It should be noted that although, in the above-described processing, the correction amount $S_{C2}$ is set on the basis of the wheel acceleration $G_W$ obtained when the mode was changed over to the pressure-reducing mode, the present invention is not limited to the same. For instance, an arrangement may be provided such that the correction amount $S_{C2}$ is set on the basis of the wheel acceleration $G_W$ after the lapse of a predetermined time (after the lapse of t msec in FIG. 13) subsequent to the changeover to the pressure-reducing mode, as shown in FIG. 13.

Figure 13:
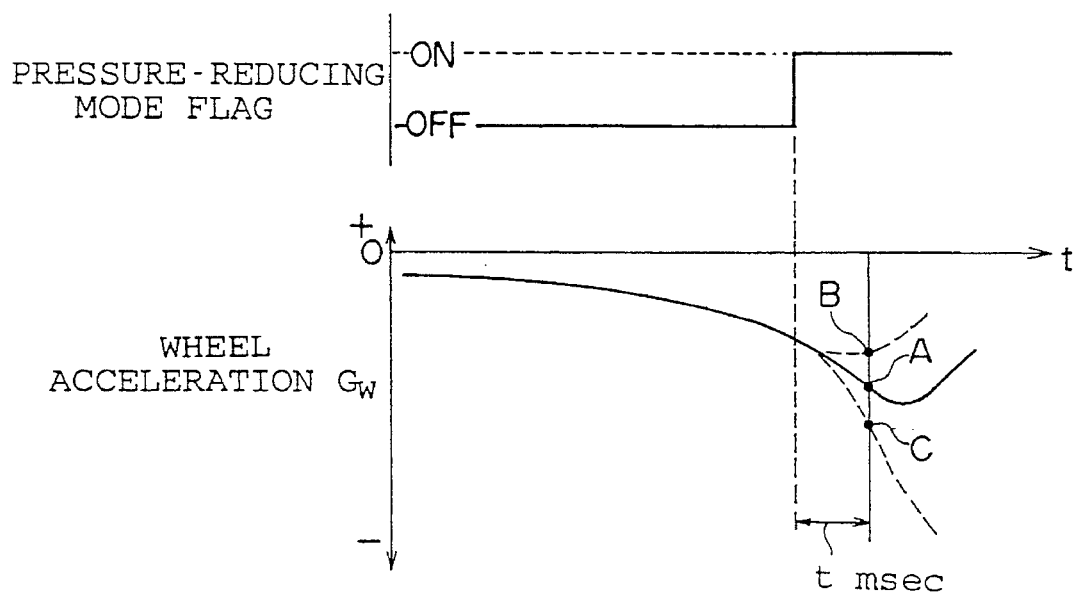
FIG. 13 is a diagram explaining as a variation of the fourth embodiment a case where a correction amount $S_{C2}$ is set on the basis of the magnitude of the wheel acceleration after the lapse of a predetermined time subsequent to a changeover to a pressure-reducing mode.

For example, in FIG. 13, the appropriate value of the wheel acceleration $G_W$ is set as A, and if the wheel acceleration $G_W$ after the lapse of t msec subsequent to the changeover to the pressure-reducing mode is A or a value in the vicinity of A, the correction amount $S_{C2}$ is set to a "0." However, if the wheel acceleration $G_W$ is greater than A by a predetermined value or more (e.g., at point B), it is determined that the targeted slip rate $S_R$ is excessively small, so that the code of the correction amount $S_{C2}$ is set to positive. Meanwhile, if the wheel acceleration $G_W$ is smaller than A by a predetermined value or more (e.g., at point C), it is determined that the targeted slip rate $S_R$ is excessively large, so that the code of the correction amount $S_{C2}$ is set to negative. Through such processing as well, it is possible to correct the targeted slip rate $S_R$ to a value corresponding to the condition of the road surface.

Figure 14:
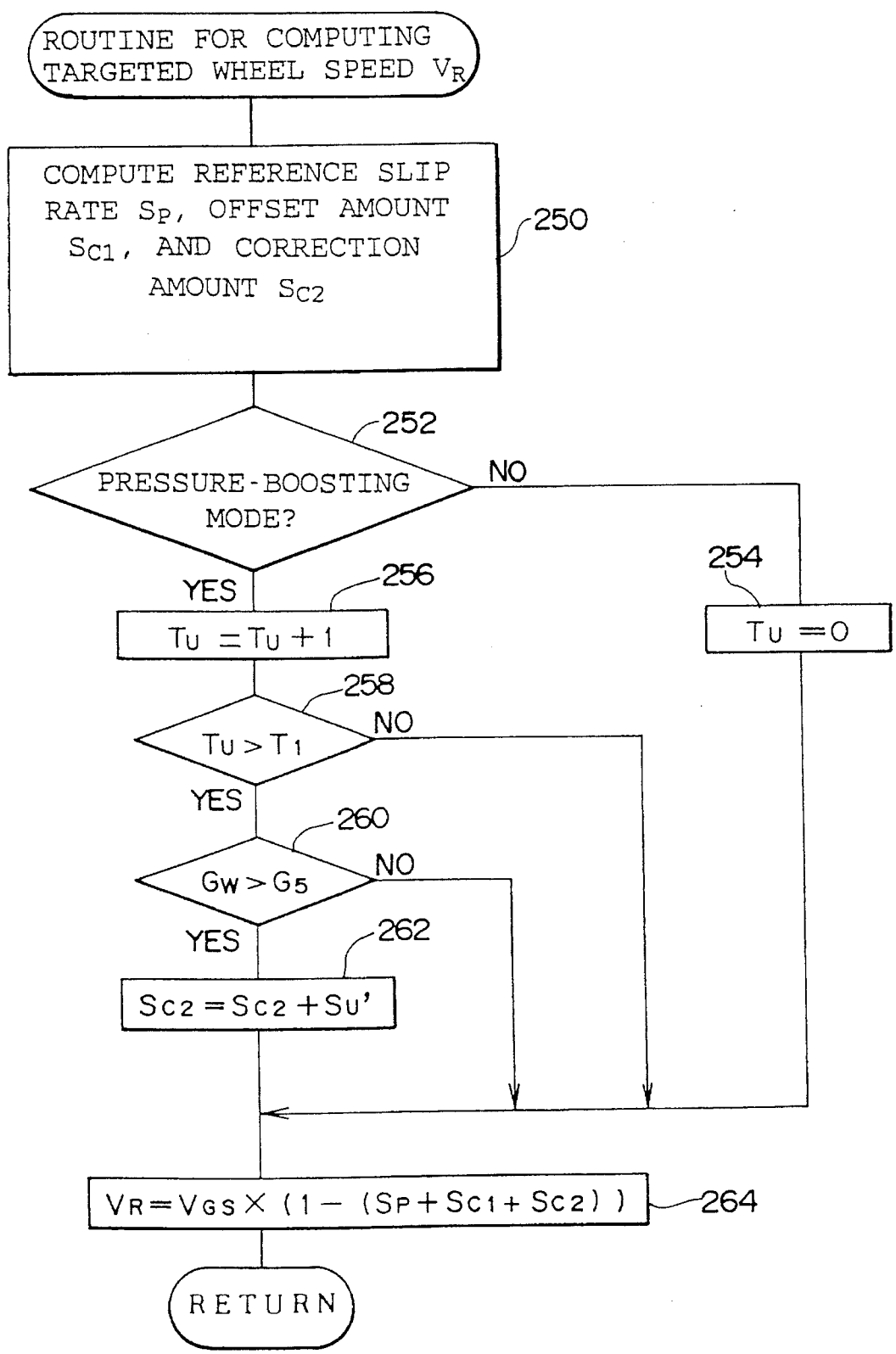
FIG. 14 is a flowchart explaining the processing for computing the targeted wheel speed in accordance with a fifth embodiment.

Next, a description will be given of a fifth embodiment of the present invention. Since the arrangement of the fifth embodiment is also substantially similar to that of the first embodiment, a detailed description thereof will be omitted. Hereafter, referring to the flowchart shown in FIG. 14, a description will be given of the processing for computing the targeted wheel speed in accordance with the fifth embodiment.

In Step 250, the reference slip rate $S_P$, the offset amount $S_{C1}$, and the correction amount $S_{C2}$ are computed. Specifically, this computing operation can be realized by effecting the processing which precedes Step 246 in the routine for computing the targeted wheel speed which has been described in the fourth embodiment. In an ensuing Step 252, a determination is made as to whether the pressure-boosting mode is presently set. If NO is the answer in the determination in Step 252, in Step 254, the value of a pressure-boosting counter $T_U$ is set to a "0," and the operation proceeds to Step 264. In Step 264, the targeted wheel speed $V_R$ is computed in accordance with Formula (5) in the same way as in Step 246 of the flowchart shown in FIG. 11.

Meanwhile, if YES is the answer in the determination in Step 252, in Step 256, the value of the pressure-boosting counter $T_U$ is incremented. In an ensuing Step 258, a determination is made as to whether the value of the pressure-boosting counter $T_U$ has become greater than or equal to a predetermined value $T_1$. Incidentally, a value of "10" or thereabouts, for example, is set as the predetermined value $T_1$. If NO is the answer in the determination in Step 258, the operation proceeds to Step 264 in the same way as described above. In addition, if the pressure-boosting mode was constantly set while the flowchart in FIG. 14 was being executed by $T_1$ times or more, YES is given as the answer in the determination in Step 258. Then, in Step 260, a determination is made as to whether the wheel acceleration $G_W$ is greater than a predetermined value $G_5$. Incidentally, the predetermined value $G_5$ is a fixed value, and a value of +2.5G or thereabouts, for example, is set as the predetermined value $G_5$.

In the pressure-boosting mode, since the braking torque is increased, if the condition of the road surface is fixed, the wheel acceleration $G_W$ is not set in the positive direction. Accordingly, NO is normally given as the answer in the determination in Step 260, and, in Step 264, the targeted wheel speed $V_R$ is computed in the same way as described above. However, if the condition of the road surface has changed suddenly, and there has been a change from a road surface having a low value of the optimal slip rate at which μ becomes maximum (such as a snowy road) to a road surface having a high value of the optimal slip rate (such as dry asphalt), even in the pressure-boosting mode, the wheel acceleration $G_W$ increases and the code becomes positive as when the braking torque is reduced. In such a case, YES is given as the answer in the determination in Step 260.

If YES is the answer in the determination in Step 160, in Step 262, a predetermined value $S_U'$ is added to the correction amount $S_{C2}$ so as to follow the aforementioned change in the condition of the road surface. Consequently, correction is provided such that the value of the targeted slip rate $S_R$ becomes large, and the targeted wheel speed $V_R$ is computed on the basis of the targeted slip rate $S_R$ corrected in correspondence with the changed condition of the road surface. Accordingly, even in cases where the condition of the road surface has changed suddenly as described above, it is possible to provide optimal braking by following such a change.

The above-described control is effective in cases where there has been a change from a road surface having a low value of the optimal slip rate at which μ becomes maximum to a road surface having a high value of the optimal slip rate. Conversely, however, in cases where there has been a change from a road surface having a high value of the optimal slip rate at which μ becomes maximum to a road surface having a low value of the optimal slip rate, the braking torque is substantially decreased correspondingly. As a result, a peak in the positive direction occurs in the wheel acceleration $G_W$ as a reaction thereof, and an appropriate targeted slip rate is set by the control which has been described in the third embodiment.

In addition, instead of the determination in Step 260 as to whether the wheel acceleration $G_W$ is greater than the predetermined value $G_5$, a determination may be made as to whether the wheel acceleration $G_W$ is greater than the predetermined value $G_5$, and whether the change in the wheel acceleration $G_W$ (specifically, the difference between the wheel acceleration $G_{W(n-1)}$ during the previous control period and the wheel acceleration $G_{W(n)}$ during the most recent control period) is greater than or equal to a predetermined value, and Step 262 may be executed if YES is given as the answer in the determination.

Figure 15:
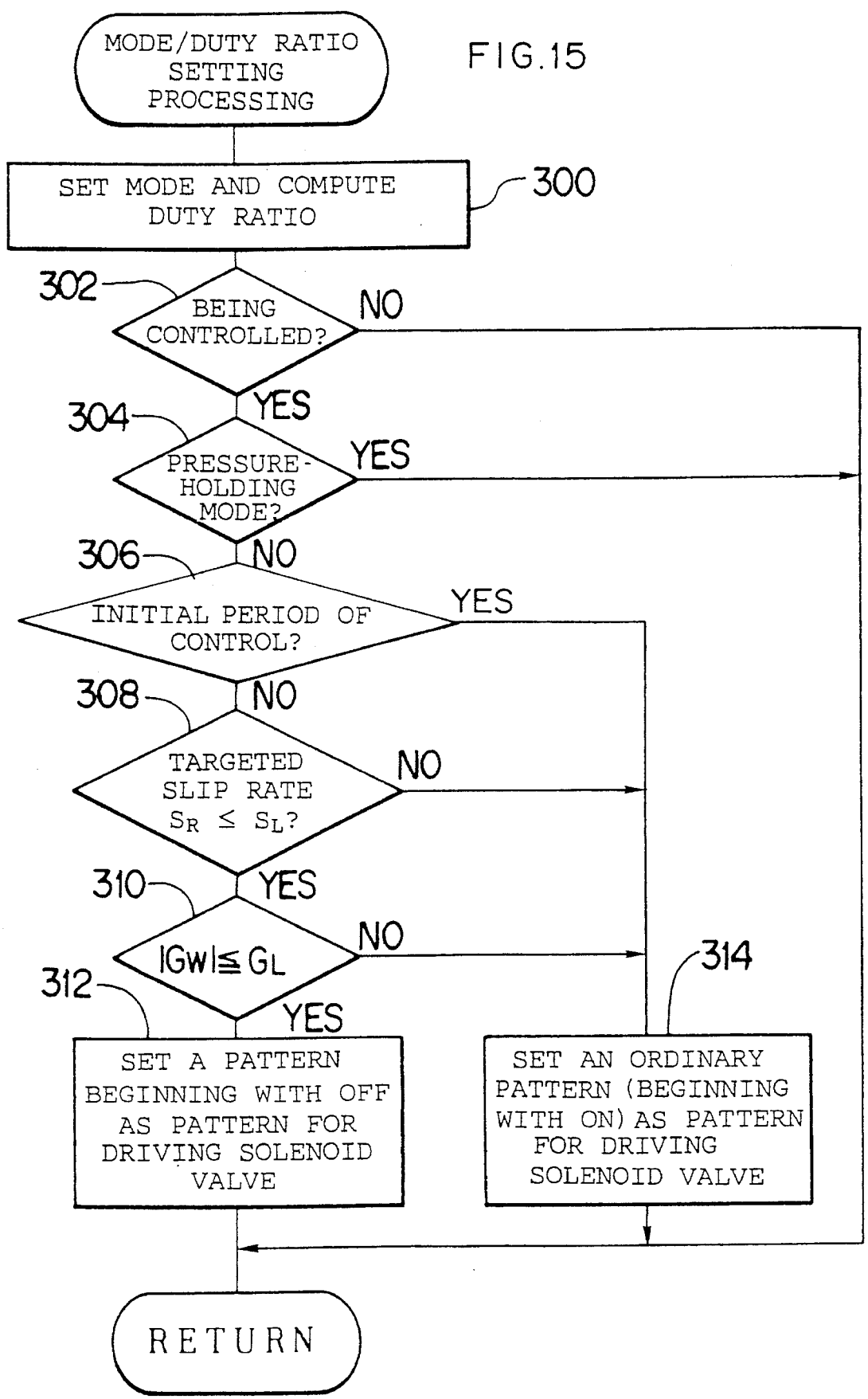
FIG. 15 is a flowchart explaining the mode/duty ratio setting processing in accordance with a sixth embodiment.

Next, a description will be given of a sixth embodiment of the present invention. Since the arrangement of the sixth embodiment is also substantially similar to that of the first embodiment, a detailed description thereof will be omitted. Hereafter, referring to the flowchart shown in FIG. 15, a description will be given of the mode/duty ratio setting processing in accordance with the sixth embodiment. Incidentally, the flowchart shown in FIG. 15 shows the mode/duty ratio setting processing which is executed instead of the processing of Step 116 in FIG. 4 in the sixth embodiment.

In Step 300, processing similar to that of Step 116 in the flowchart shown in FIG. 4 is executed. Namely, the mode is set in accordance with Table 1 by comparing the targeted wheel speed $V_R$ and the targeted wheel acceleration $G_R$ with the wheel speed $V_W$ and the wheel acceleration $G_W$, respectively. At the same time, the duty ratio is set such that the value becomes higher as the difference between the wheel speed $V_W$ and the targeted wheel speed $V_R$, or the difference between the wheel acceleration $G_W$ and the targeted wheel acceleration $G_R$, becomes larger. In addition, if the brake switch 40 has not been turned on, the mode is set to the normal mode by assuming that control is not to be provided.

In an ensuing Step 302, a determination is made as to whether control of the braking torque (brake pressure) is already being carried out. If YES is the answer in the determination in Step 302, the operation proceeds to Step 304 to determine whether the currently set mode is the pressure-holding mode. If NO is the answer in the determination in Step 302 or YES is the answer in the determination in Step 304, the mode/duty ratio setting processing is ended without performing any processing. If the currently set mode is the pressure-boosting mode or the pressure-reducing mode, NO is given as the answer in the determination in Step 304, and, in Step 306, a determination is made as to whether the most recent control period has been an initial period of control, i.e., whether control of the brake pressure was not provided during the previous control period, and whether control of the brake pressure has been started during the most recent control period.

If YES is the answer in the determination in Step 306, in Step 308, a determination is made as to whether the targeted slip rate $S_R$ computed in the routine for computing the targeted wheel speed is less than or equal to a predetermined value $S_L$. As the predetermined value $S_L$, a value which is lower than the slip rate at which μ becomes maximum in a case where the road surface is dry asphalt, for instance, is set. If YES is the answer in the determination in Step 308, since a low value has been set as the targeted slip rate $S_R$, it can be determined that the road surface is the so-called low μ road where the slip rate at which μ becomes maximum is low. In Step 310, a determination is made as to whether the absolute value $|G_W|$ of the wheel acceleration is less than a predetermined value $G_L$.

Figure 16A:
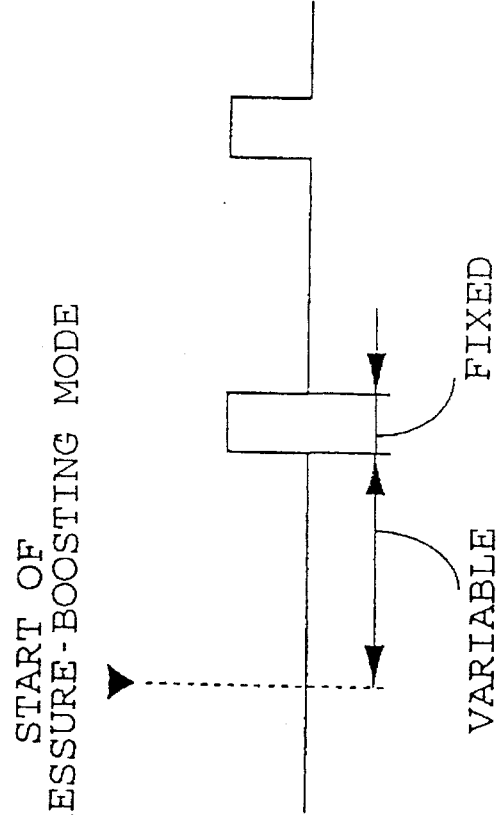
FIG. 16A is a diagram illustrating an ordinary pattern as a pattern for driving a solenoid of a solenoid valve.
Figure 16B:
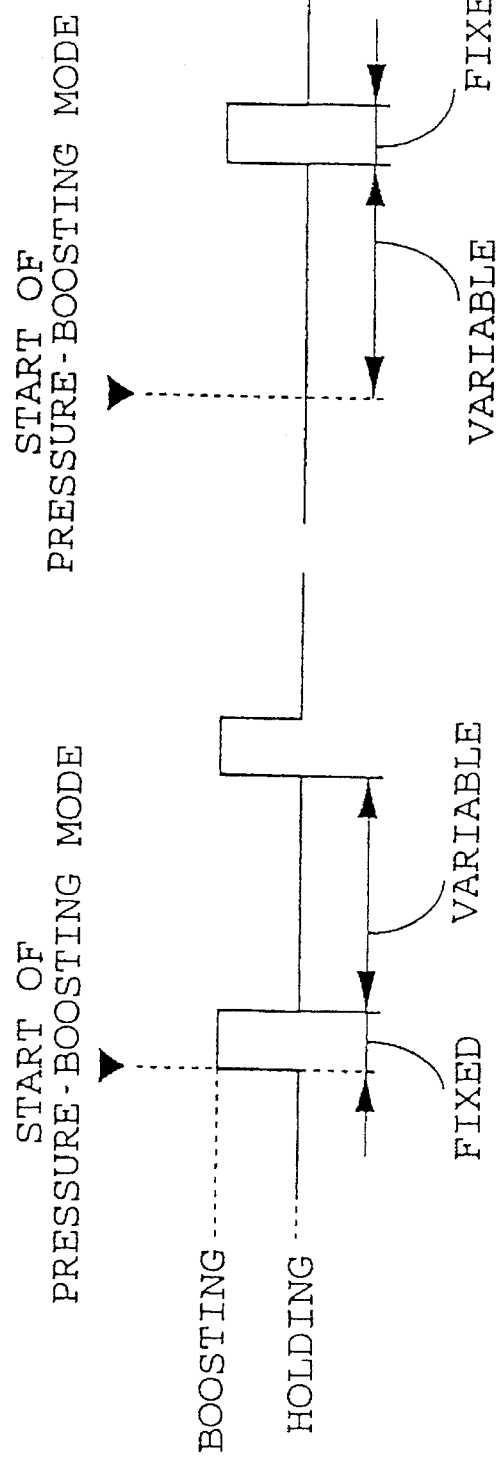
FIG. 16B is a diagram in which a pattern in a case where it is unnecessary to change the brake pressure at high speed is illustrated as a pattern for driving the solenoid of the solenoid valve.

If YES is the answer in the determination in Step 310, it means that the control period is not an initial period, and the road surface is a low μ road, and the absolute value of the wheel acceleration is small, so that it is determined that it is unnecessary to change the brake pressure at high speed. Then, in Step 312, a pattern (see FIG. 16B) which begins with off (holding of the brake pressure) is set as a driving pattern for the solenoid valve. Meanwhile, if YES is the answer in the determination in Step 306, or if NO is the answer in the determination in Step 308 or 310, it is determined that there is a need to change the brake pressure at high speed. Hence, in Step 314, the solenoid valve is set to an ordinary pattern, i.e., a pattern which begins with on (see FIG. 16A). In the brake-pressure control routine, the solenoid of the solenoid valve is driven in accordance with the driving pattern set in Step 312 or 314.

Figure 17A:
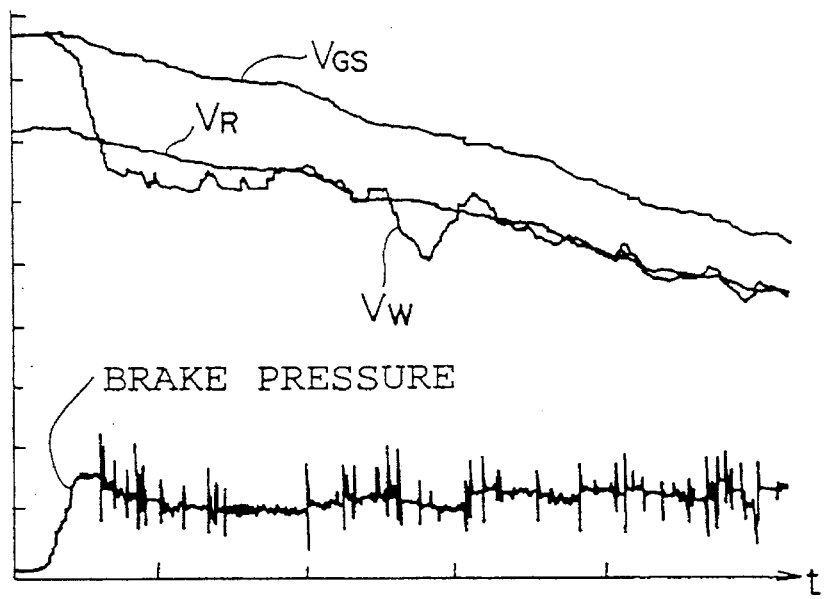
FIG. 17A is a diagram illustrating the change in brake pressure due to control in accordance with the sixth embodiment.
Figure 17B:
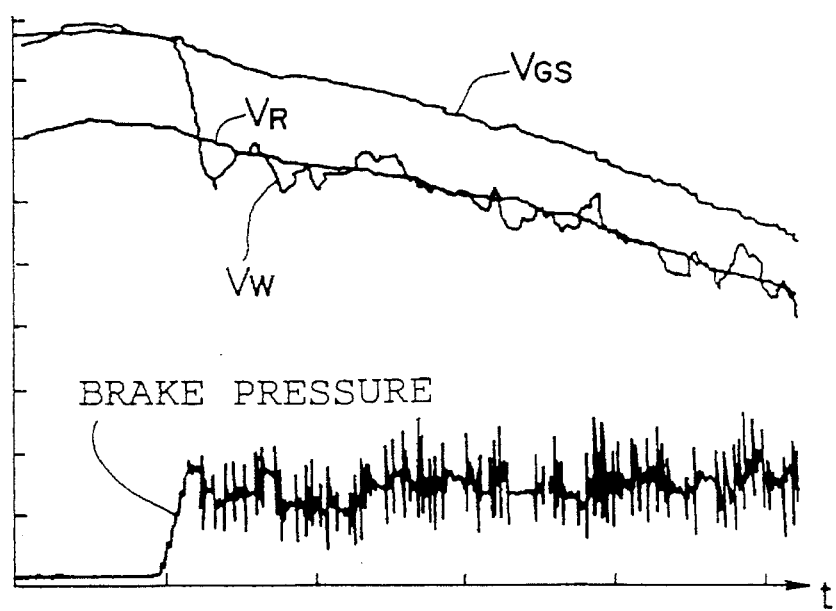
FIG. 17B is a diagram illustrating the change in brake pressure due to conventional control.

The change in brake pressure at a time when the above-described control is effected is shown in FIG. 17A. In the curve of the change in brake pressure shown in the drawing, the pulse-like peaks occurring on the upper side thereof show boostings of the brake pressure by the pressure-boosting signals. Meanwhile, the pulse-like peaks occurring on the lower side show reductions in the brake pressure by the pressure-reducing signals. If this drawing is compared with FIG. 17B which shows the result of control according to conventional control, it is apparent that the frequency of the occurrence of the pulse-like peaks can be reduced substantially.

During these pulse-like peaks, actuating noise occurs due to changes in the state of the solenoid, and impulsive noise also occurs due to sudden changes in the pressure of the hydraulic fluid (e.g., brake fluid) in the braking device 10. Therefore, it can be appreciated that the control according to this embodiment makes it possible to reduce the frequency of the occurrence of impulsive noise and the like which are produced due to the on-off operation of the solenoid valves 18, thereby preventing discomfort from being imparted to the occupant.

Although, in the above-described processing, the vehicle speed $V_{GS}$ is detected by the vehicle-to-ground speed sensor 38, the present invention is not limited to the same, and the vehicle speed $V_{GS}$ may be determined by an estimation from the wheel speed $V_W$. However, in the case where the vehicle speed $V_{GS}$ is determined by an estimation, it is necessary to effect processing in a shorter period to eliminate the effect of error, with the result that the load applied to the controller 24 increases.

In addition, although, in the above-described embodiment, computation is effected by using as the wheel acceleration the wheel acceleration $G_W$ in which the vehicle deceleration $G_{GS}$ is added to the acceleration difference $V_W'$ (the wheel acceleration defined in Formula (2)), it goes without saying that computation may be effected by using the acceleration difference $V_W'$ as the wheel acceleration.

Furthermore, although, in the above-described embodiment, the change in the road-surface reactive torque (and μ) is detected from the wheel acceleration, to be accurate, the wheel acceleration (i.e., the acceleration difference $V_W'$) is proportional to the difference between the road-surface reactive torque and the braking torque, as is apparent from Formula (2). Accordingly, if the braking torque changes, the accuracy with which the road-surface reactive torque (and μ) is estimated declines. Although, in the above-described embodiment, the targeted slip rate $S_R$ is determined from the wheel acceleration by assuming that the change in the braking torque is sufficiently small, if there is a need to estimate the condition of the road surface more accurately, the braking torque may be determined by detecting the hydraulic pressure within the braking device, and the targeted slip rate $S_R$ may be determined by using this braking torque.

What is claimed is:

1. An anti-lock controller comprising:

a sensor that detects a wheel speed of a vehicle;

determining means for determining if wheel deceleration based on the wheel speed is at least as great as a predetermined wheel deceleration based on vehicle deceleration;

first computing means for computing slip rate when the determining means determines that the wheel deceleration is at least as great as the predetermined wheel deceleration;

second computing means for computing slip rate offset amount between the slip rate and a targeted slip rate, based on at least one of the wheel deceleration and the vehicle deceleration;

third computing means for computing a targeted wheel speed based on the slip rate, the slip rate offset amount and a vehicle speed; and controlling means for controlling a braking force such that the wheel speed approaches the targeted wheel speed.

2. The controller of claim 1, wherein the second computing means computes the slip rate offset amount based on a magnitude of a wheel acceleration existing during a period from the time the wheel deceleration becomes the predetermined value based on said vehicle deceleration.

3. The controller of claim 2, further comprising:

second determining means for determining whether vibrational change to the wheel acceleration occurs; and slip rate computing means for computing the slip rate when the wheel deceleration has become maximized, wherein said third computing means computes the targeted wheel speed by setting as the targeted slip rate as the slip rate computed by said slip rate computing means if said second determining means determines that the vibrational change to the wheel acceleration has occurred.

4. The controller of claim 2, further comprising first correcting means for computing a first corrected slip rate offset amount based on a magnitude of the vehicle deceleration during a predetermined period in which the control means is reducing the braking force, wherein the third computing means computes the targeted wheel speed based on the slip rate, the first corrected slip rate offset amount and the vehicle speed.

5. The controller of claim 4, further comprising second determining means for determining if the wheel deceleration is at least as great as a second predetermined wheel speed value after a predetermined interval following an increase in the braking force by the control means, and second correcting means for computing a second corrected slip rate offset amount greater than the slip rate offset amount when the second determining means determines that the wheel deceleration is at least as great as the second predetermined wheel speed value, wherein the third computing means computes the targeted wheel speed based on the slip rate, the second corrected slip rate offset amount and the vehicle speed.

6. The controller of claim 1, further comprising:

second determining means for determining whether vibrational change to the wheel deceleration occurs; and slip rate computing means for computing the slip rate existing when the wheel acceleration has become maximized, wherein said slip rate computing means computes the targeted wheel speed by setting as the targeted slip rate the slip rate computed by the slip rate computing means if said second determining means determines that the vibrational change has occurred.

7. The controller of claim 1, further comprising first correcting means for computing a first corrected slip rate offset amount based on a magnitude of the vehicle deceleration during a predetermined period in which the control means is reducing the braking force, wherein the third computing means computes the targeted wheel speed based on the slip rate, the first corrected slip rate offset amount and the vehicle speed.

8. The controller of claim 7, further comprising second determining means for determining if the wheel deceleration is at least as great as a second predetermined wheel speed value after a predetermined interval following an increase in the braking force by the control means, and second correcting means for computing a second corrected slip rate offset amount greater than the slip rate offset amount when the second determining means determines that the wheel deceleration is at least as great as the second predetermined wheel speed value, wherein the third computing means computes the targeted wheel speed based on the slip rate, the second corrected slip rate offset amount and the vehicle speed.

9. The controller of claim 1, further comprising a vehicle speed sensor that detects the vehicle speed.

10. The controller of claim 1, further comprising a braking device having a solenoid value that regulates fluid pressure of the braking device to adjust the braking force applied through the fluid pressure to wheels of the vehicle, wherein the controlling means includes switching means for switching the solenoid valve between on and off positions and the controlling means controls the braking force by changing a duty ratio of on position intervals to off position intervals, and the controlling means holds the braking force by setting the solenoid valve to begin cycling in the off position for a variable interval.

11. The controller of claim 1, wherein the second computing means for computing a slip rate includes relative speed determining means for determining a relative speed between the vehicle speed and the wheel speed and quotient determining means for determining a quotient of the relative speed divided by the vehicle speed, and wherein said second computing means computes said slip rate to be proportional to said quotient.

12. An anti-lock controller comprising:
a sensor that detects a wheel speed of a vehicle;
a determining unit that determines if wheel deceleration based on the wheel speed is at least as great as a predetermined wheel deceleration based on a vehicle deceleration;
a computing unit that computes a slip rate, a slip rate offset amount and a targeted wheel speed, the computing unit computing the slip rate when the determining unit determines that the wheel deceleration is at least as great as the predetermined wheel deceleration, wherein the computing unit computes the slip rate offset amount between the slip rate and a targeted slip rate based on at least one of the wheel deceleration and the vehicle deceleration, and the computing unit computes the targeted wheel speed based on the slip rate, the slip rate offset amount and a vehicle speed; and
a control unit that controls a braking force such that the wheel speed approaches the targeted wheel speed.

13. A method for controlling braking of a vehicle with an anti-lock controller, comprising:
sensing a wheel speed;
determining if a wheel deceleration based on the wheel speed is at least as great as a predetermined wheel deceleration based on a vehicle deceleration;
computing a slip rate based on at least one of the wheel deceleration and the vehicle deceleration when said determining circuit determines that the wheel deceleration is at least as great as the predetermined wheel deceleration;
computing a slip rate offset amount between the slip rate and a targeted slip rate based on at least one of the wheel deceleration and the vehicle deceleration;
computing a targeted wheel speed based on the slip rate, the slip rate offset amount and a vehicle speed; and
controlling a braking force so the wheel speed approaches the targeted wheel speed.

14. The method of claim 13, wherein the slip rate offset amount is computed based on a magnitude of the wheel deceleration existing during a period from the time the wheel deceleration becomes the predetermined value based on said vehicle deceleration.

15. The method of claim 14, further comprising the steps of:
determining whether a vibrational change to the wheel acceleration occurs; and
computing the slip rate when the wheel deceleration is maximized, wherein said computing step computes the targeted wheel speed by setting as the targeted slip rate the computed slip rate if the vibrational change has occurred.

16. The method of claim 14, wherein the step of computing a slip rate offset amount includes correcting the slip rate offset amount based on a magnitude of the vehicle deceleration during a predetermined period in which the braking force is being reduced, wherein the targeted wheel speed is computed based on the slip rate, a corrected slip rate offset amount and the vehicle speed.

17. The method of claim 16, further comprising determining whether the wheel deceleration is at least as great as a second predetermined wheel speed after a predetermined interval following an increase in the braking force, wherein the step of computing a slip rate offset amount includes computing a second corrected slip rate offset amount by increasing the slip rate offset amount when the wheel deceleration is determined to be at least as great as the second predetermined wheel speed, and wherein the targeted wheel speed is computed based on the slip rate, the second corrected slip rate offset amount and the vehicle speed.

18. The method of claim 13, further comprising the steps of:
determining whether a vibrational change to the wheel acceleration occurs; and computing the slip rate existing when the wheel acceleration is maximized, wherein said computing step computes the targeted wheel speed by setting as the targeted slip rate the computed slip rate if the vibrational change has occurred.

19. The method of claim 13, wherein the step of computing a slip rate offset amount includes correcting the slip rate offset amount based on a magnitude of the vehicle deceleration during a predetermined period in which the braking force is being reduced, wherein the targeted wheel speed is computed based on the slip rate, a corrected slip rate offset amount and the vehicle speed.

20. The method of claim 19, further comprising determining whether the wheel deceleration is at least as great as a second predetermined wheel speed after a predetermined interval following an increase in the braking force, wherein the step of computing a slip rate offset amount includes computing a second corrected slip rate offset amount by increasing the slip rate offset amount when the wheel deceleration is determined to be at least as great as the second predetermined wheel speed, and wherein the targeted wheel speed is computed based on the slip rate, the second corrected slip rate offset amount and the vehicle speed.

* * * * *